(12) United States Patent
Takahashi et al.

(10) Patent No.: US 12,466,196 B2
(45) Date of Patent: Nov. 11, 2025

(54) DRAWING SYSTEM AND DRAWING METHOD

(71) Applicant: Sony Group Corporation, Tokyo (JP)

(72) Inventors: Isao Takahashi, Tokyo (JP); Satoko Asaoka, Tokyo (JP); Mitsunari Hoshi, Tokyo (JP); Masahiro Takada, Tokyo (JP); Taichi Takeuchi, Tokyo (JP); Kenichi Kurihara, Tokyo (JP); Aya Tejima, Tokyo (JP)

(73) Assignee: Sony Group Corporation, Tokyo (JP)

( * ) Notice: Subject to any disclaimer, the term of this patent is extended or adjusted under 35 U.S.C. 154(b) by 42 days.

(21) Appl. No.: 18/284,391

(22) PCT Filed: Mar. 30, 2022

(86) PCT No.: PCT/JP2022/016287
§ 371 (c)(1),
(2) Date: Sep. 27, 2023

(87) PCT Pub. No.: WO2022/210970
PCT Pub. Date: Oct. 6, 2022

(65) Prior Publication Data
US 2024/0165983 A1    May 23, 2024

(30) Foreign Application Priority Data
Mar. 31, 2021   (JP) .................. 2021-061778

(51) Int. Cl.
*B41M 5/28* (2006.01)
*B41J 2/44* (2006.01)
(Continued)

(52) U.S. Cl.
CPC ............... *B41J 2/473* (2013.01); *B41J 2/442* (2013.01); *B41J 2/475* (2013.01); *B41M 5/284* (2013.01);
(Continued)

(58) Field of Classification Search
CPC ........ B41M 5/282; B41M 5/284; B41M 5/30; B41M 5/305; B41M 5/323; B41M 5/333;
(Continued)

(56) References Cited

U.S. PATENT DOCUMENTS

2007/0268356 A1* 11/2007 Murakami ............... B41J 2/473
347/233
2007/0285488 A1   12/2007 Ishimi et al.
(Continued)

FOREIGN PATENT DOCUMENTS

JP   H0958025 A    3/1997
JP   2004188827 A  7/2004
(Continued)

OTHER PUBLICATIONS

International Search Report from corresponding PCT application PCT/JP2022/016287, dated May 10, 2022.

*Primary Examiner* — Douglas X Rodriguez
*Assistant Examiner* — Kendrick X Liu
(74) *Attorney, Agent, or Firm* — K&L Gates LLP

(57) ABSTRACT

A drawing system according to an embodiment of the present disclosure includes a light source section and a scanning section. The light source section generates a plurality of laser light beams having wavelengths that are different from each other and each correspond to an absorption wavelength of a photothermal conversion agent included in a recording medium. The scanning section scans a surface of the recording medium with the plurality of laser light beams in a state in which irradiation spots of the plurality of laser light beams are arranged side by side at predetermined intervals in a direction orthogonal to or obliquely intersecting with a scanning direction of the plurality of laser light beams.

12 Claims, 12 Drawing Sheets

(51) Int. Cl.

| | | |
|---|---|---|
| *B41J 2/47* | (2006.01) | |
| *B41J 2/475* | (2006.01) | |
| *B41M 5/30* | (2006.01) | |
| *B41M 5/323* | (2006.01) | |
| *B41M 5/333* | (2006.01) | |
| *B41M 5/34* | (2006.01) | |

(52) U.S. Cl.
CPC ........ *B41M 5/34* (2013.01); *B41J 2002/4756* (2013.01)

(58) Field of Classification Search
CPC ..... B41M 5/34; B41J 2/44; B41J 2/442; B41J 2/475; B41J 2/4753; B41J 2002/4756; B41J 2/471; B41J 2/473
See application file for complete search history.

(56) References Cited

U.S. PATENT DOCUMENTS

| | | | |
|---|---|---|---|
| 2008/0123509 A1* | 5/2008 | Murakami | B41J 2/473 369/121 |
| 2010/0231816 A1* | 9/2010 | Mikajiri | H04N 1/032 349/2 |
| 2014/0160221 A1 | 6/2014 | Cridland | |
| 2015/0277221 A1 | 10/2015 | Waumans et al. | |
| 2021/0370688 A1 | 12/2021 | Kurihara et al. | |

FOREIGN PATENT DOCUMENTS

| | | | |
|---|---|---|---|
| JP | 2004188829 A | 7/2004 | |
| JP | 2004249539 A | 9/2004 | |
| JP | 2004249540 A | 9/2004 | |
| JP | 2004322492 A | 11/2004 | |
| JP | 2005138558 A | 6/2005 | |
| JP | 2005144952 A | 6/2005 | |
| JP | 2008213440 A | 9/2008 | |
| JP | 2019055515 A | 4/2019 | |
| WO | WO-2018235446 A1 * | 12/2018 | ............ B41J 2/4753 |
| WO | WO-2020054330 A1 * | 3/2020 | ............ B41J 2/442 |
| WO | 2020090402 A1 | 5/2020 | |

* cited by examiner

[FIG. 1]
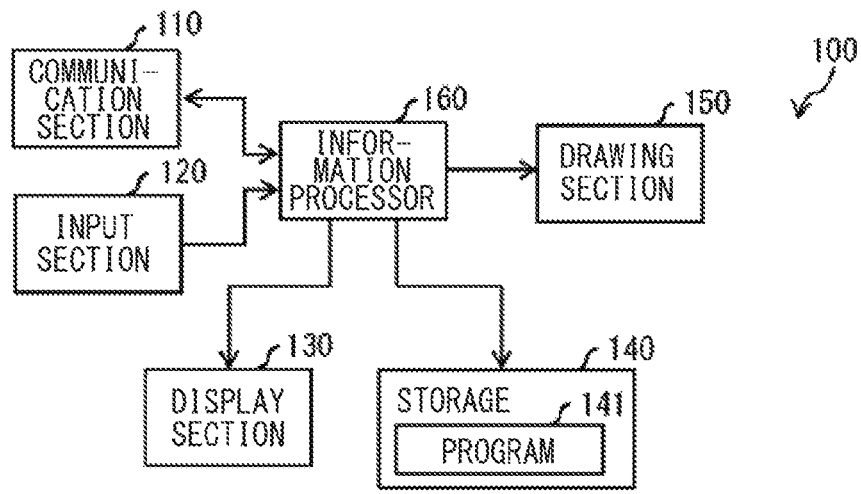
[FIG. 2]
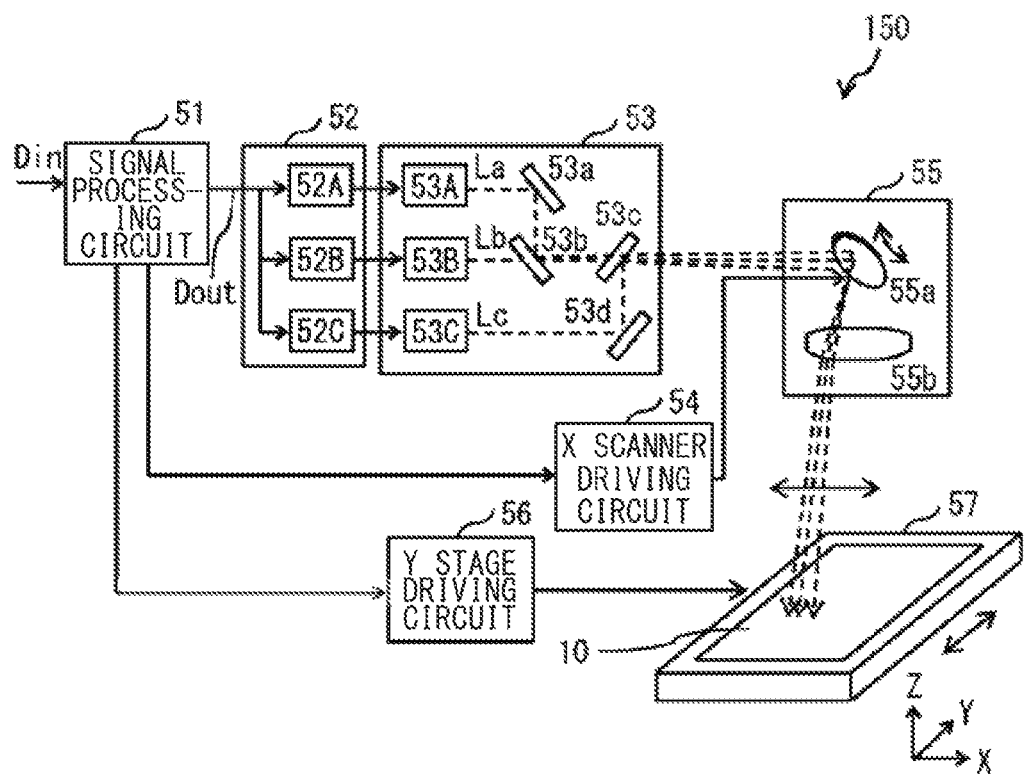

[ FIG. 3 ]
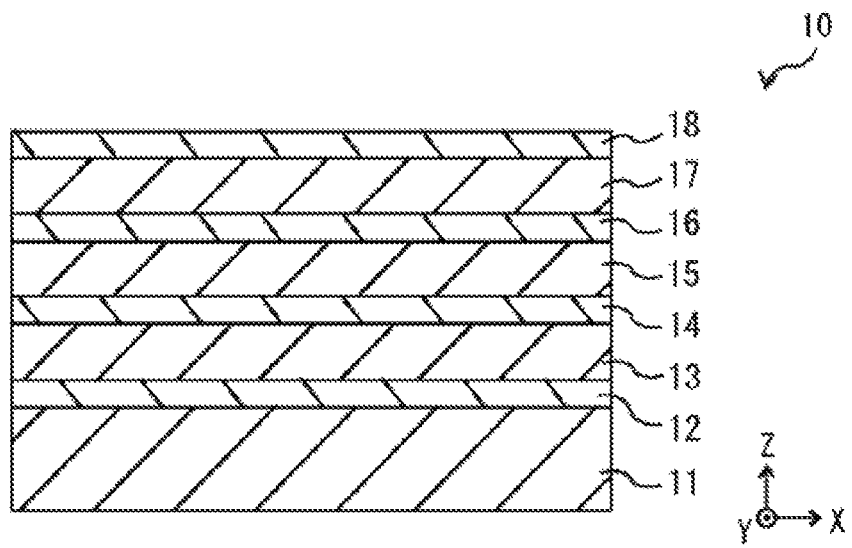
[ FIG. 4A ]
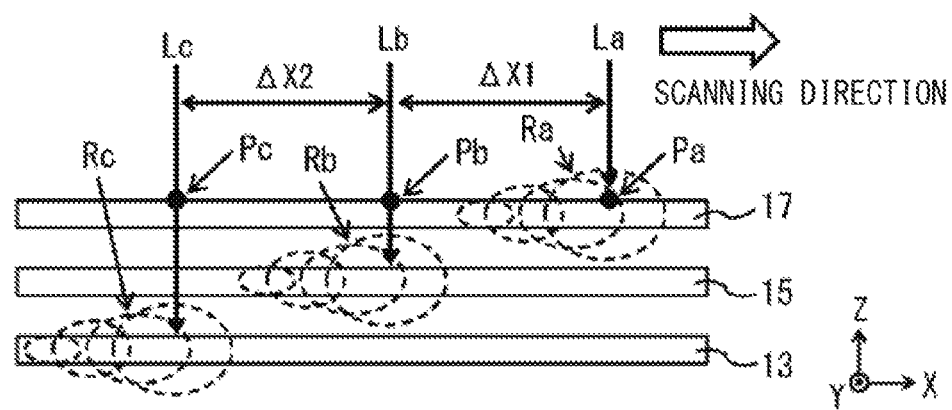

[FIG. 4B]
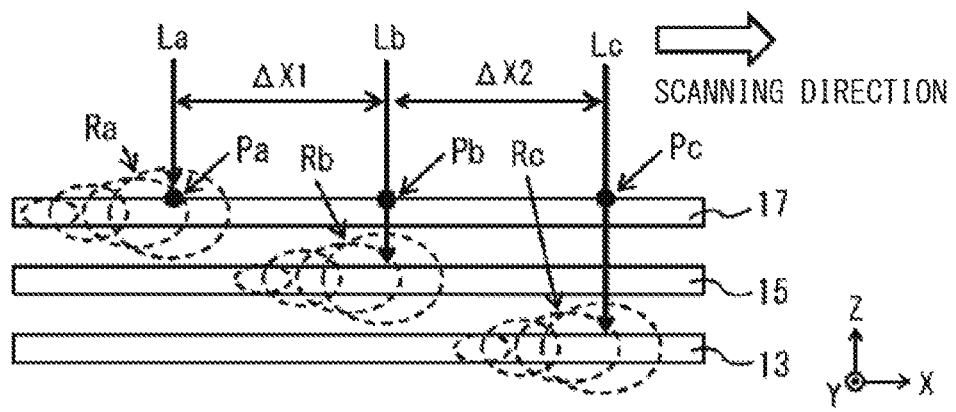
[FIG. 5]
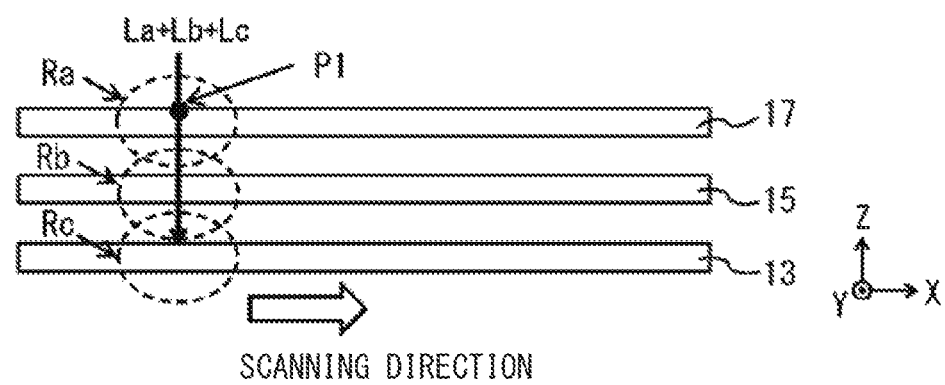

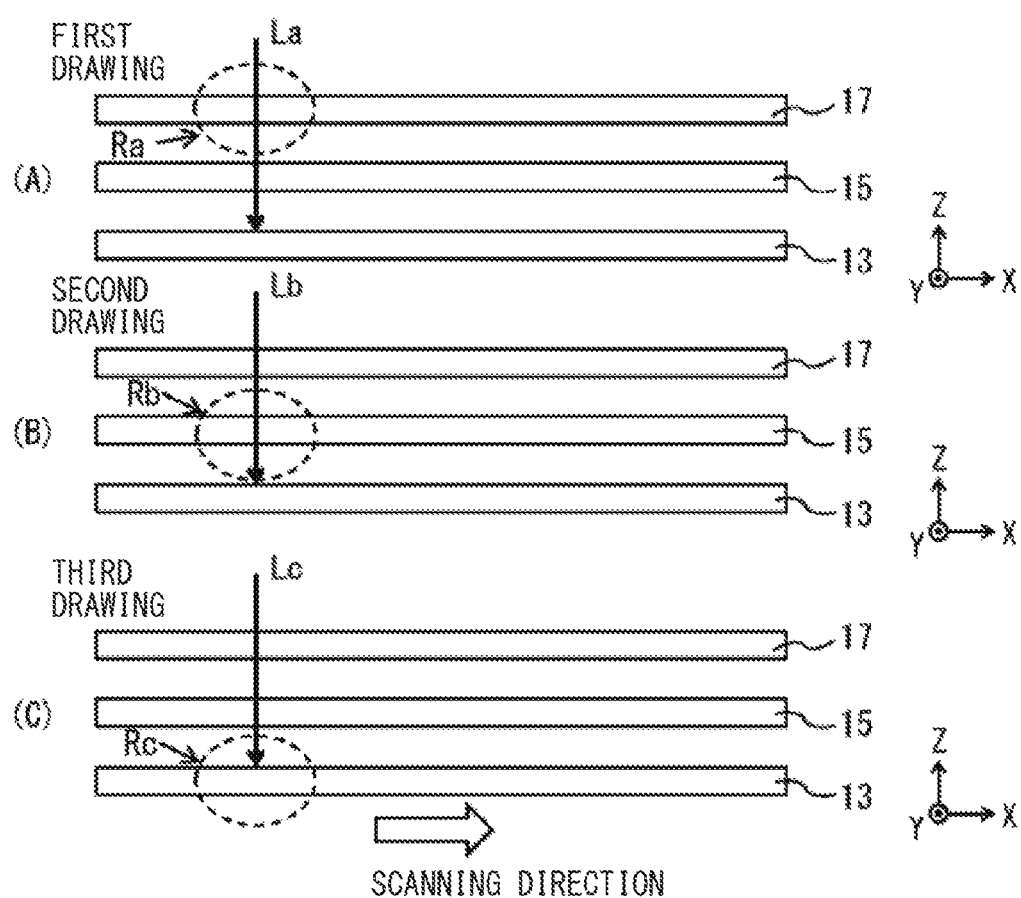

[FIG. 7]
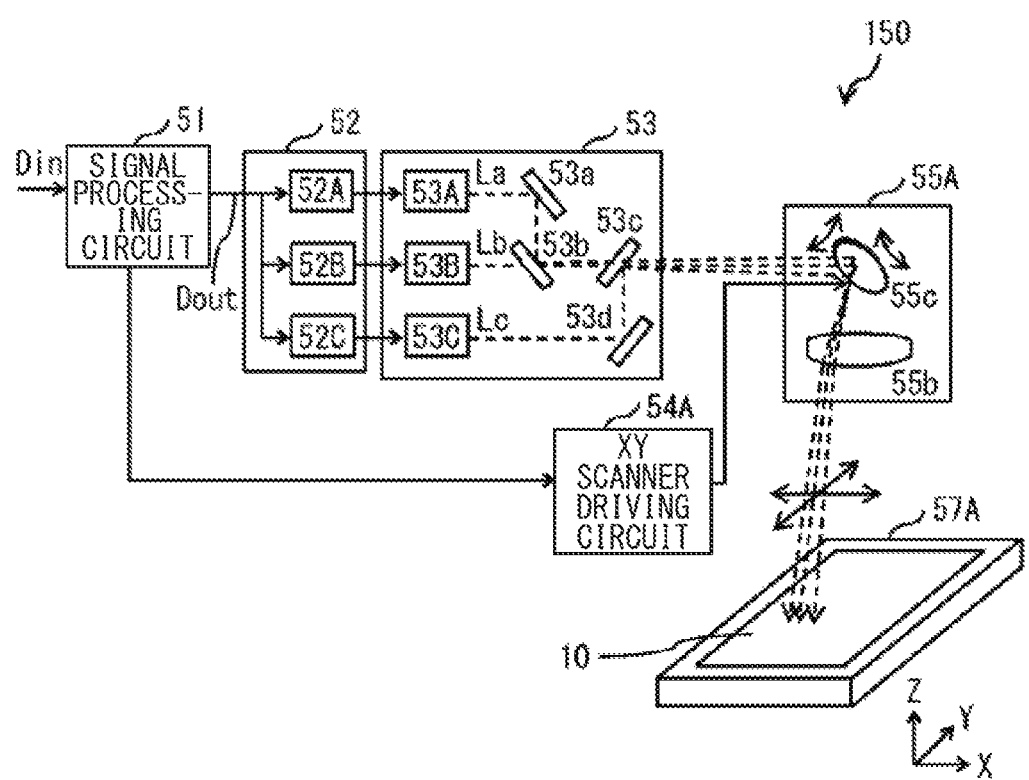

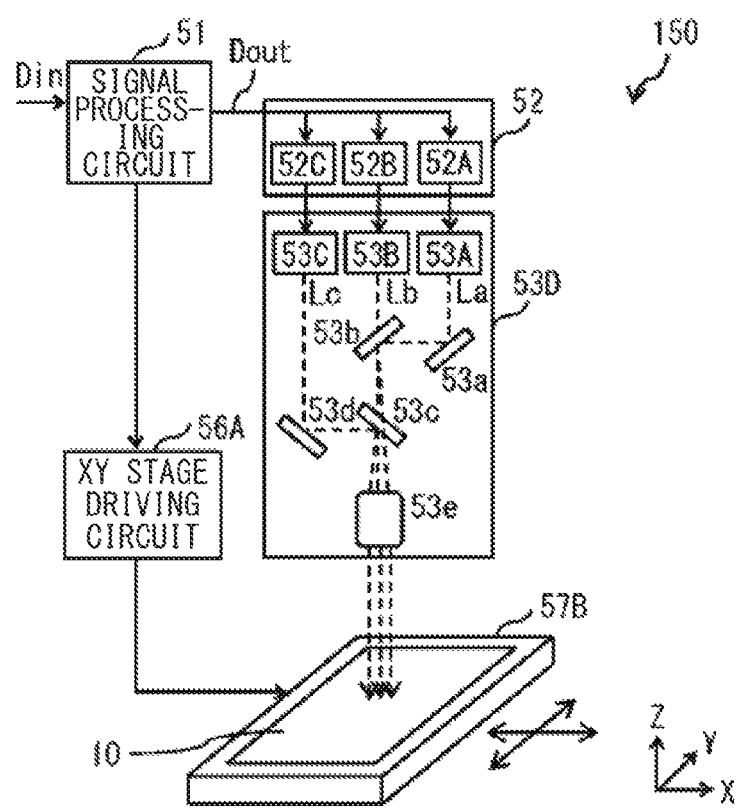
[FIG. 8]

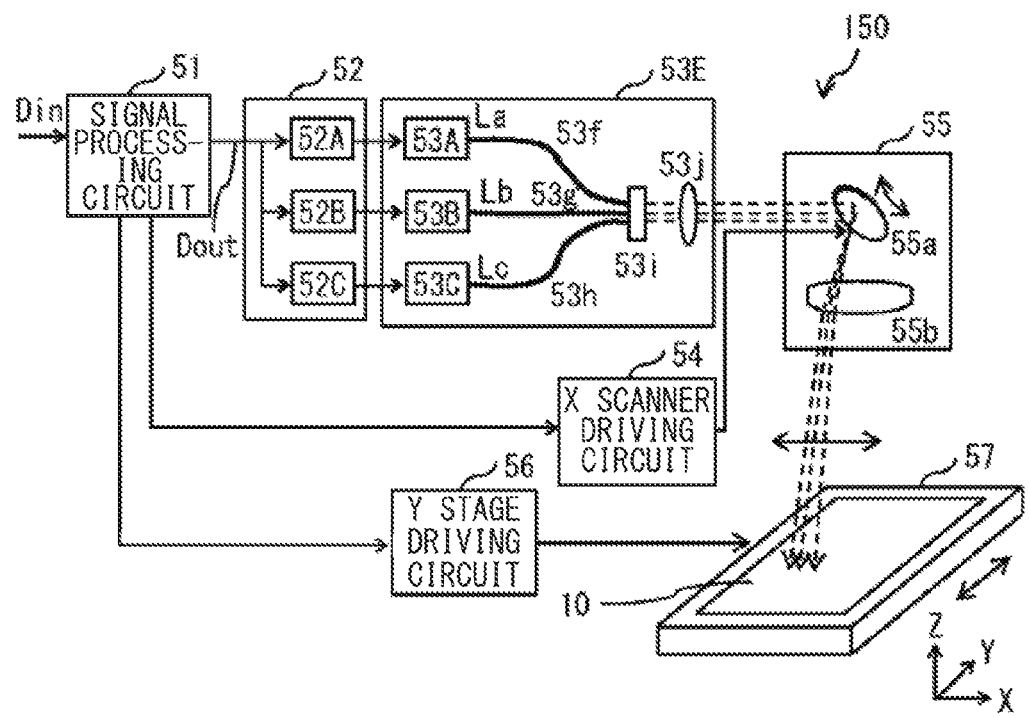
[FIG. 9]

[FIG. 10]
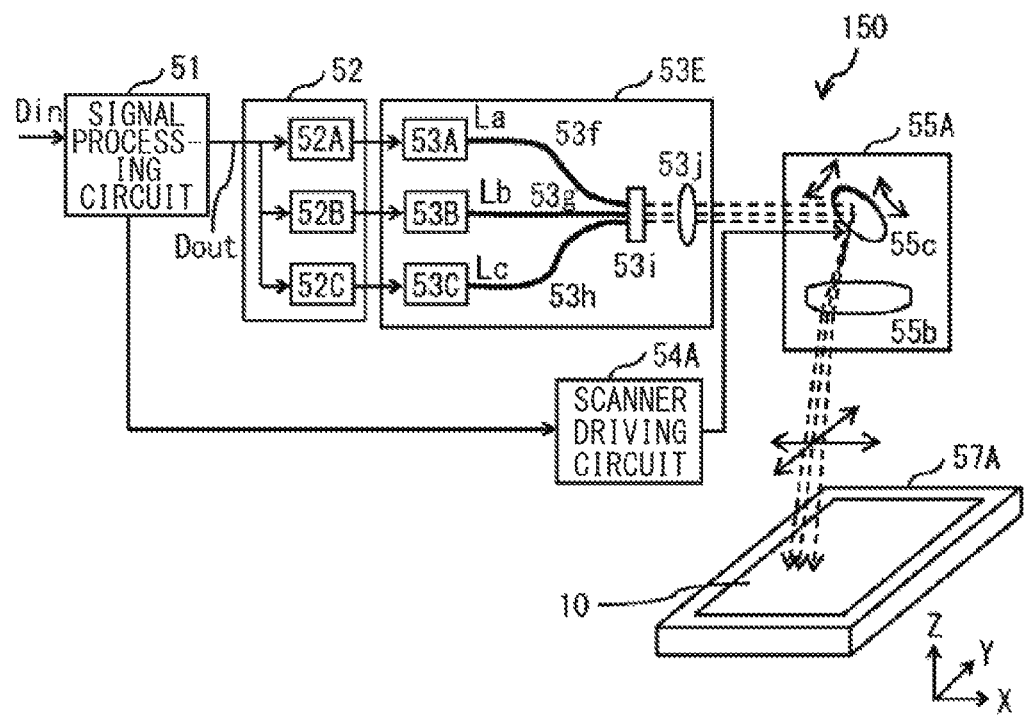

[ FIG. 11 ]
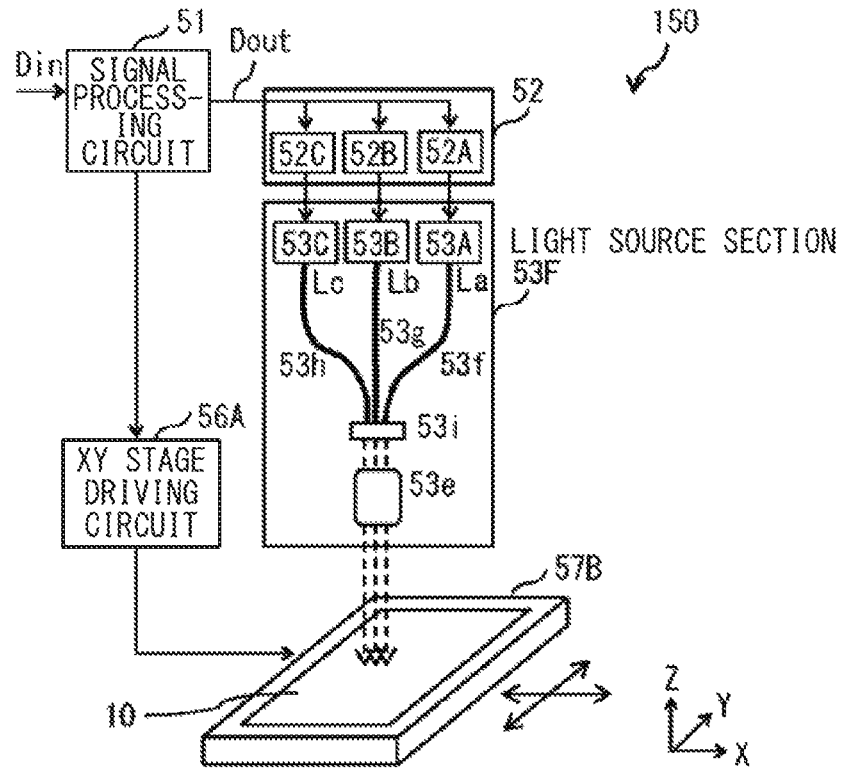
[ FIG. 12 ]
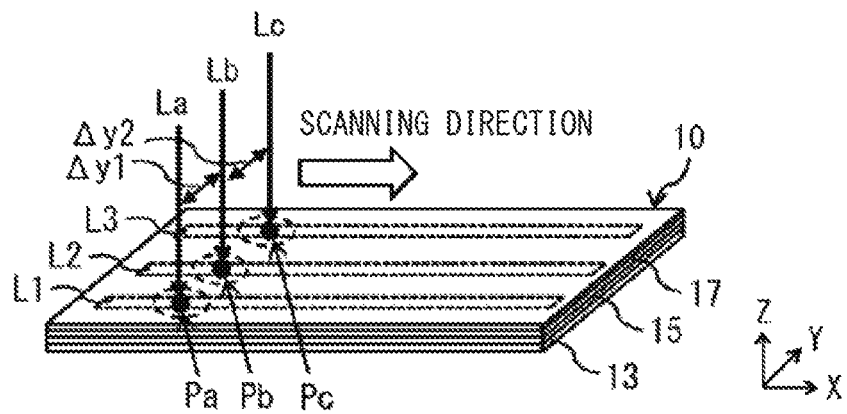

[ FIG. 13 ]
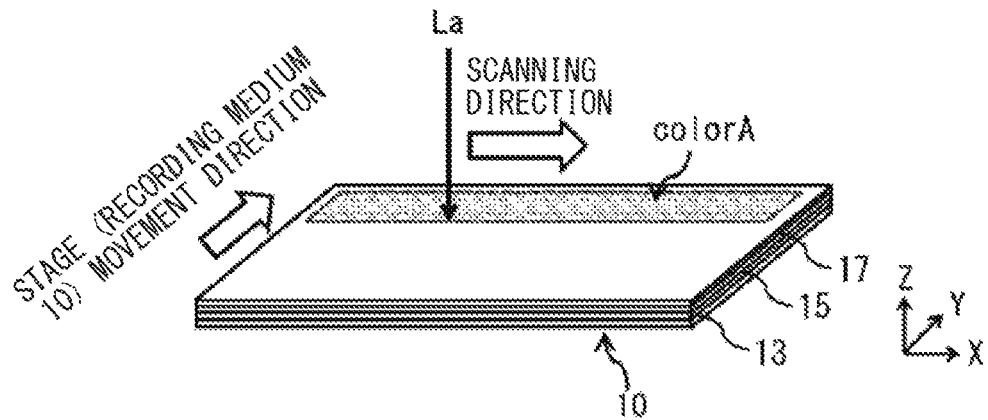
[ FIG. 14 ]
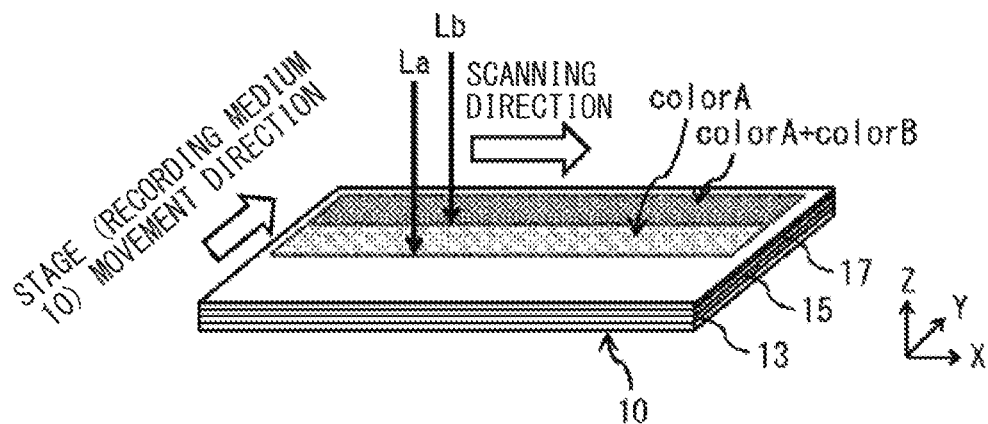
[ FIG. 15 ]
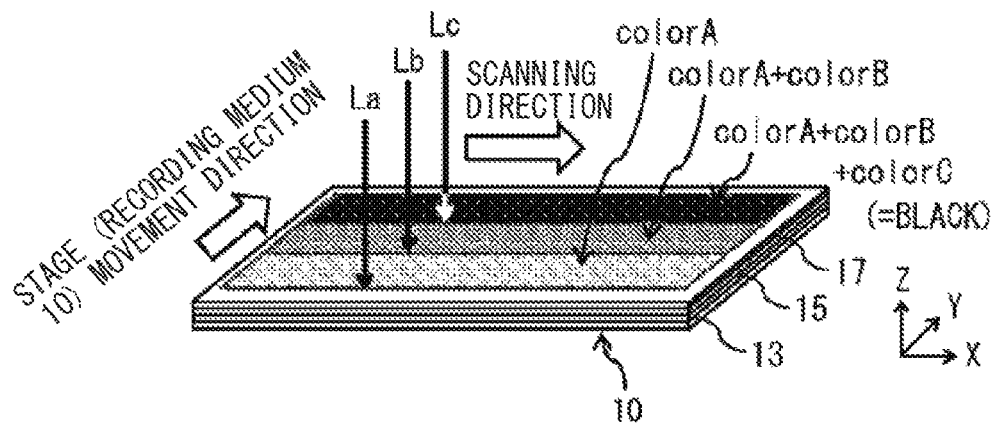

[FIG. 16]

| | | COMPA-RATIVE EXAMPLE | EXAMPLE | | | | | | | | | | |
|---|---|---|---|---|---|---|---|---|---|---|---|---|---|
| | | | 1 | 2 | 3 | 4 | 5 | 6 | 7 | 8 | 9 | 10 | 11 |
| SHIFT AMOUNT (μm) | Δy1 | 0 | 0 | 300 | 600 | 900 | 1200 | 1000 | 1500 | 2100 | 3000 | 4000 | 4800 |
| | Δy2 | 0 | 0 | 300 | 600 | 900 | 1200 | 180 | 1500 | 2100 | 3000 | 4000 | 4800 |
| ΔE_avb (BLACK) | | REFERENCE | 21.5 | 14.3 | 9.5 | 7.0 | 6.0 | 5.5 | 5.0 | 4.6 | 4.4 | 3.7 | 3.5 |
| DETERMINATION | | – | × | × | × | × | ○ | ○ | ○ | ○ | ○ | ○ | ○ |
| TAKT | | REFERENCE | 1/3 | 1/3 | 1/3 | 1/3 | 1/3 | 1/3 | 1/3 | 1/3 | 1/3 | 1/3 | 1/3 |

[ FIG. 17 ]
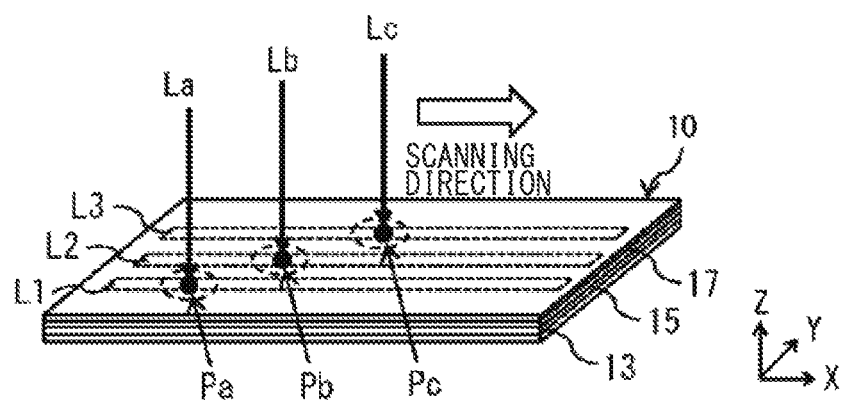

DRAWING SYSTEM AND DRAWING METHOD

TECHNICAL FIELD

The present disclosure relates to a drawing system and a drawing method.

BACKGROUND ART

A recording medium on which reversible recording and erasing of information are performed by heat, that is, a so-called reversible heat-sensitive recording medium has been developed as a display medium in place of printed matters. In the reversible heat-sensitive recording medium, for example, a plurality of reversible heat-sensitive recording layers different from each other in photothermal conversion wavelengths are stacked with a heat-insulating layer interposed therebetween. A reversible heat-sensitive recording medium is irradiated with a laser light beam having a predetermined wavelength to cause a specific reversible heat-sensitive recording layer to selectively generate heat and be colored or decolored by the action of the generated heat, thereby performing recording or erasing of information (see PTL 1, for example).

CITATION LIST

Patent Literature

PTL 1: Japanese Unexamined Patent Application Publication No. 2004-188827

SUMMARY OF THE INVENTION

Incidentally, upon simultaneously performing writing or erasing on respective reversible heat-sensitive recording layers in the same pixel, there is a possibility that thermal crosstalk occurs between two reversible heat-sensitive recording layers adjacent in a stacking direction to thereby cause unexpected writing or erasing. It is therefore desirable to provide a drawing system and a drawing method that are resistant to unexpected writing and erasing.

A drawing system according to an embodiment of the present disclosure is a drawing system that performs drawing on a recording medium that includes a plurality of recording layers stacked with a heat-insulating layer interposed therebetween. The plurality of recording layers includes coloring compounds different from each other and photothermal conversion agents different from each other. This drawing system includes a light source section and a scanning section. The light source section generates a plurality of laser light beams having wavelengths that are different from each other and correspond to absorption wavelengths of the photothermal conversion agents. The scanning section irradiates a surface of the recording medium with the plurality of laser light beams generated by the light source section at predetermined intervals, and scans the surface of the recording medium with the plurality of laser light beams in synchronization in a same direction. The scanning section scans the surface of the recording medium with the plurality of laser light beams in a state in which irradiation spots of the plurality of laser light beams are arranged side by side at predetermined intervals in a direction orthogonal to or obliquely intersecting with a scanning direction of the plurality of laser light beams.

In the drawing system according to the embodiment of the present disclosure, the surface of the recording medium is scanned with the plurality of laser light beams in a state in which the irradiation spots of the plurality of laser light beams generated by the light source section are arranged side by side at the predetermined intervals in the direction orthogonal to or obliquely intersecting with the scanning direction of the plurality of laser light beams. This makes it possible to reduce occurrence of thermal crosstalk between recording layers adjacent in a stacking direction. As a result, it is possible to reduce a possibility that unexpected writing and erasing occur.

A drawing method according to an embodiment of the present disclosure is a method of performing drawing on a recording medium that includes a plurality of recording layers stacked with a heat-insulating layer interposed therebetween. The plurality of recording layers includes coloring compounds different from each other and photothermal conversion agents different from each other. The drawing method includes the following three:

(1) generating a plurality of laser light beams having wavelengths that are different from each other and correspond to absorption wavelengths of the photothermal conversion agents;

(2) irradiating a surface of the recording medium with the plurality of laser light beams generated at predetermined intervals, and scanning the surface of the recording medium with the plurality of laser light beams in synchronization in a same direction; and (3) scanning the surface of the recording medium with the plurality of laser light beams in a state in which irradiation spots of the plurality of laser light beams are arranged side by side at predetermined intervals in a direction orthogonal to or obliquely intersecting with a scanning direction of the plurality of laser light beams.

In the drawing method according to the embodiment of the present disclosure, the surface of the recording medium is scanned with the plurality of laser light beams in a state in which the irradiation spots of the plurality of laser light beams generated by the light source section are arranged side by side at the predetermined intervals in the direction orthogonal to or obliquely intersecting with the scanning direction of the plurality of laser light beams. This makes it possible to reduce occurrence of thermal crosstalk between recording layers adjacent in the stacking direction. As a result, it is possible to reduce a possibility that unexpected writing and erasing occur.

BRIEF DESCRIPTION OF DRAWINGS

FIG. 1 is a diagram illustrating an exemplary schematic configuration of a drawing system according to an embodiment of the present disclosure.

FIG. 2 is a diagram illustrating an exemplary schematic configuration of a drawing section in FIG. 1.

FIG. 3 is a diagram illustrating an exemplary cross-sectional configuration of a recording medium in FIG. 2.

FIG. 4A is a diagram illustrating a drawing state in the drawing system in FIG. 1.

FIG. 4B is a diagram illustrating the drawing state in the drawing system in FIG. 1.

FIG. 5 is a diagram illustrating an example of a drawing method according to a comparative example.

FIG. 6 is a diagram illustrating an example of the drawing method according to the comparative example.

FIG. 7 is a diagram illustrating a modification example of a schematic configuration of the drawing system in FIG. 1.

FIG. 8 is a diagram illustrating a modification example of a schematic configuration of the drawing system in FIG. 1.

FIG. 9 is a diagram illustrating a modification example of a schematic configuration of the drawing system in FIG. 1.

FIG. 10 is a diagram illustrating a modification example of a schematic configuration of the drawing system in FIG. 1.

FIG. 11 is a diagram illustrating a modification example of a schematic configuration of the drawing system in FIG. 1.

FIG. 12 is a diagram illustrating a modification example of a drawing method in the drawing system in FIG. 1, and FIGS. 7 to 11.

FIG. 13 illustrates an example of a drawing procedure in the drawing method in FIG. 12.

FIG. 14 illustrates an example of the drawing procedure in the drawing method in FIG. 12.

FIG. 15 illustrates an example of the drawing procedure in the drawing method in FIG. 12.

FIG. 16 illustrates determination results of images drawn with use of the drawing method in FIG. 12.

FIG. 17 is a diagram illustrating a modification example of the drawing method in FIG. 12.

MODES FOR CARRYING OUT THE INVENTION

In the following, some embodiments of the present disclosure are described in detail with reference to the drawings. The following description is one specific example of the present disclosure, and the present disclosure is not limited thereto.

1. Embodiment

[Configuration]

Description is given of a drawing system 100 according to an embodiment of the present disclosure. FIG. 1 illustrates an exemplary schematic configuration of the drawing system 100 according to the present embodiment. The drawing system 100 writes (draws) and erases information on a recording medium 10 to be described later. The drawing system 100 converts, for example, externally inputted image data described in a device-dependent color space (hereinafter, referred to as "input image data") into image data described in a color space of the recording medium 10 (hereinafter, referred to as "drawing image data"). Here, the device-dependent color space is an RGB color space such as sRGB or adobe (registered trademark) RGB, for example. The color space of the recording medium 10 is a color space which the recording medium 10 has as characteristics. The drawing system 100 further converts, for example, the drawing image data obtained by the conversion into output setting values of a drawing section 150 to be described later and inputs the output setting values obtained by the conversion to the drawing section 150 to thereby perform drawing on the recording medium 10. In the following, first, the drawing system 100 is described, and then the recording medium 10 is described.

(Drawing System 100)

The drawing system 100 includes, for example, a communication section 110, an input section 120, a display section 130, a storage 140, the drawing section 150, and an information processor 160. The drawing system 100 is coupled to a network via the communication section 110, for example. The network is, for example, a communication line such as LAN or WAN. For example, a terminal device is coupled to the network. The drawing system 100 is configured to be able to communicate with the terminal device via the network. The terminal device is, for example, a mobile terminal, and is configured to be able to communicate with the drawing system 100 via the network.

The communication section 110 communicates with an external device such as the terminal device. The communication section 110 transmits, for example, input image data received from the external device such as the mobile terminal, to the information processor 160. The input image data is data in which gradation values of each drawing coordinate are described in the device-dependent color space. In the input image data, the gradation values of each drawing coordinate include, for example, an 8-bit red gradation value, an 8-bit green gradation value, and an 8-bit blue gradation value.

The input section 120 accepts input from a user (e.g., an execution instruction, data input, etc.). The input section 120 transmits information inputted by the user to the information processor 160. The display section 130 displays a screen on the basis of various pieces of screen data created by the information processor 160. The display section 130 includes, for example, a liquid crystal panel, an organic EL (Electro Luminescence) panel, or the like.

The storage 140 stores, for example, various programs. The storage 140 stores, for example, a program for converting input image data described in the device-dependent color space into drawing image data described in the color space of the recording medium 10. The drawing image data is, for example, data in which gradation values of each drawing coordinate are described in the color space of the recording medium 10. In a case where the color space of the recording medium 10 is a leuco color space, the gradation values of each drawing coordinate in the drawing image data include, for example, an 8-bit magenta gradation value, an 8-bit cyan gradation value, and an 8-bit yellow gradation value. The storage 140 stores, for example, a program for deriving output setting values of the drawing section 150 for each drawing coordinate on the basis of the gradation values of the drawing image data obtained by the conversion. In FIG. 1, these programs are collectively expressed as a program 141.

The information processor 160 includes, for example, a CPU (central Processing Unit) and a GPU (Graphics Processing Unit), and executes various programs (e.g., the program 141) stored in the storage 140. The information processor 160 executes a series of procedures described in the program 141, for example, by loading the program 141.

Next, description is given of the drawing section 150. FIG. 2 illustrates an exemplary schematic configuration of the drawing section 150. The drawing section 150 includes, for example, a signal processing circuit 51, a laser driving circuit 52, a light source section 53, a scanner driving circuit 54, an X scanner section 55, a Y stage driving circuit 56, and a Y stage 57. The drawing section 150 executes drawing on the recording medium 10 on the basis of a voltage value file (a list of command voltage values) inputted from the information processor 160 by controlling output of the light source section 53.

The signal processing circuit 51 acquires the voltage value file (the list of command voltage values) inputted from the information processor 160 as an image signal Din. The signal processing circuit 51 generates, for example, from the image signal Din, a pixel signal Dout corresponding to a scanner operation of the X scanner section 55. The pixel signal Dout causes the light source section 53 (e.g., each of light sources 53A, 53B, and 53C to be described later) to output a laser light beam having power corresponding to the command voltage values. The signal processing circuit 51 controls, together with the laser driving circuit 52, a peak value of current pulses to be applied to the light source section 53 (e.g., each of the light sources 53A, 53B, and 53C) depending on the pixel signal Dout.

The laser driving circuit 52 drives each of the light sources 53A, 53B, and 53C of the light source section 53 in accordance with the pixel signal Dout, for example. The laser driving circuit 52 controls, for example, luminance (brightness) of a laser light beam for drawing an image corresponding to the pixel signal Dout. The laser driving circuit 52 includes, for example, a driving circuit 52A that drives the light source 53A, a driving circuit 52B that drives the light source 53B, and a driving circuit 52C that drives the light source 53C. The light sources 53A, 53B, and 53C each output a laser light beam having power corresponding to the command voltage values to the recording medium 10 to thereby execute drawing on the recording medium 10. The light sources 53A, 53B, and 53C each emit a laser light beam in a near infrared region. The light source 53A is, for example, a semiconductor laser that emits a laser light beam La having a light emission wavelength $\lambda 1$. The light source 53B is, for example, a semiconductor laser that emits a laser light beam Lb having a light emission wavelength $\lambda 2$. The light source 53C is, for example, a semiconductor laser that emits a laser light beam Lc having a light emission wavelength $\lambda 3$.

The light source section 53 has a plurality of light sources (e.g., three light sources 53A, 53B, and 53C) different from each other in light emission wavelengths in the near infrared region. Each of the light sources (e.g., each of the light sources 53A, 53B, and 53C) generates a laser light beam having a wavelength corresponding to an absorption wavelength of a photothermal conversion agent (to be described later) included in the recording medium 10. The light source section 53 further includes, for example, an optical system that arranges a plurality of laser light beams (e.g., three laser light beams La, Lb, and Lc) emitted from the plurality of light sources (e.g., the three light sources 53A, 53B, and 53C) side by side in a predetermined direction at predetermined intervals, and outputs the plurality of laser light beams. For example, this optical system outputs the plurality of laser light beams La, Lb, and Lc to the X scanner section 55 to cause a plurality of irradiation spots Pa, Pb, and Pc generated on the recording medium 10 by the plurality of laser light beams La, Lb, and Lc to be arranged side by side in an X-axis direction on a Y stage 57 at predetermined intervals. The X-axis direction is a direction orthogonal to a movement direction (Y-axis direction) of the Y stage 57, and is a direction parallel to a scanning direction of a one-axis scanner 55a to be described later. The light source section 63 includes, for example, two reflection mirrors 53a and 53d, and two dichroic mirrors 53b and 53c as such an optical system.

Each of the laser light beams La and Lb emitted from the two light sources 53A and 53B is converted into substantially parallel light (collimated light) by a collimating lens, for example. Thereafter, for example, the laser light beam La is reflected by the reflection mirror 53a and further reflected by the dichroic mirror 53b, and the laser light beam Lb is transmitted through the dichroic mirror 53b. Thus, the laser light beam La and the laser light beam Lb are outputted side by side in a predetermined direction. The laser light beams La and Lb are transmitted through the dichroic mirror 53c.

The laser light beam Lc emitted from the light source 53C is converted into substantially parallel light (collimated light) by a collimating lens. Thereafter, for example, the laser light beam Lc is reflected by the reflection mirror 53d and further reflected by the dichroic mirror 53c. Thus, the laser light beams La and Lb transmitted through the dichroic mirror 53c and the laser light beam Lc reflected by the dichroic mirror 53c are outputted side by side in a predetermined direction. The light source section 53 outputs, to the X scanner section 55, for example, the laser light beams La, Lb, and Lc arranged side by side in the predetermined direction by the optical system described above.

Here, on the dichroic mirror 53b, a spot where the laser light beam La is reflected and a spot where the laser light beam Lb is transmitted may overlap each other. In this case, the optical system is configured to cause an optical axis of the laser light beam La reflected by the dichroic mirror 53b and an optical axis of the laser light beam Lb transmitted through the dichroic mirror 53b to intersect with each other at a predetermined angle. Alternatively, on the dichroic mirror 53b, the spot where the laser light beam La is reflected and the spot where the laser light beam Lb is transmitted may not completely overlap each other and may be shifted from each other. Alternatively, on the dichroic mirror 53b, the spot where the laser light beam La is reflected and the spot where the laser light beam Lb is transmitted may be separated from each other. In these cases, the optical system may be configured to cause the optical axis of the laser light beam La reflected by the dichroic mirror 53b and the optical axis of the laser light beam Lb transmitted through the dichroic mirror 53b to intersect with each other at a predetermined angle, or the optical system may be configured to cause the optical axis of the laser light beam La reflected by the dichroic mirror 53b and the optical axis of the laser light beam Lb transmitted through the dichroic mirror 53b to be parallel to each other.

The optical system is configured to cause a spot where the laser light beam La or the laser light beam Lb is transmitted and a spot where the laser light beam Lc is reflected to be shifted from each other on the dichroic mirror 53c without completely overlapping each other. In this case, on the dichroic mirror 53c, the spot where the laser light beam La is transmitted, the spot where the laser light beam Lb is transmitted, and the spot where the laser light beam Lc is reflected may be arranged side by side in a predetermined direction while being slightly shifted from each other. On the dichroic mirror 53c, the spot where the laser light beam La is transmitted, the spot where the laser light beam Lb is transmitted, and the spot where the laser light beam Lc is reflected may be arranged side by side at predetermined intervals.

In these cases, the optical system may be configured to cause the optical axis of the laser light beam La transmitted through the dichroic mirror 53c, the optical axis of the laser light beam Lb transmitted through the dichroic mirror 53c, and the optical axis of the laser light beam LC reflected by the dichroic mirror 53c to intersect with each other at a predetermined angle. In this case, the light source section 53 outputs the plurality of laser light beams La, Lb, and Lc to the X scanner section 55 in a state in which the optical axes of the plurality of laser light beams La, Lb, and Lc are shifted from each other, and outputs the plurality of laser light beams La, Lb, and Lc to the X scanner section 55 to cause the optical axes of the plurality of laser light beams La, Lb, and Lc to intersect with each other at a predetermined angle.

In addition, the optical system may be configured to cause the optical axis of the laser light beam La transmitted through the dichroic mirror 53c, the optical axis of the laser light beam Lb transmitted through the dichroic mirror 53c, and the optical axis of the laser light beam LC reflected by the dichroic mirror 53c to be parallel to each other. In this case, the light source section 53 outputs the plurality of laser light beams La, Lb, and Lc to the X scanner section 55 in a state in which the optical axes of the plurality of laser light beams La, Lb, and Lc are shifted from each other, and outputs the plurality of laser light beams La, Lb, and Lc to the X scanner section 55 to cause the optical axes of the plurality of laser light beams La, Lb, and Lc to be parallel to each other at predetermined intervals.

The scanner driving circuit 54 drives the X scanner section 55, for example, on the basis of a control signal inputted from the signal processing circuit 51. In addition, in a case where a signal of an irradiation angle of the one-axis scanner 55a to be described later or the like is inputted from the X scanner section 55, the scanner driving circuit 54 drives the X scanner section 55 to cause the irradiation angle to be a desired irradiation angle on the basis of the signal.

The X scanner section 55 scans, for example, a surface of the recording medium 10 in the X-axis direction with the plurality of laser light beams La, Lb, and Lc incident from the light source section 53. The X scanner section 55 includes, for example, the one-axis scanner 55a and an fθ lens 55b. The one-axis scanner 55a is, for example, a galvanometer mirror that scans, for example, the surface of the recording medium 10 in the X-axis direction with the laser light beams La, Lb, and Lc incident from the light source section 53 on the basis of a drive signal inputted from the scanner driving circuit 54. The fθ lens 55b converts a constant velocity rotation movement by the one-axis scanner 55a into a constant velocity linear movement of a spot moving on a focal plane (the surface of the recording medium 10).

The Y stage driving circuit 56 drives the Y stage 57, for example, on the basis of a control signal inputted from the signal processing circuit 51. The Y stage 57 moves the recording medium 10 placed on the Y stage 57 with respect to the X scanner section 55 at a predetermined velocity in the Y-axis direction by displacing the Y stage 57 in the Y-axis direction at a predetermined velocity. The surface of the recording medium 10 is raster-scanned with the laser light beams La, Lb, and Lc by a cooperative operation of the X scanner section 55 and the Y stage 57.

(Recording Medium 10)

Next, description is given of the recording medium 10.

FIG. 3 illustrates an exemplary configuration of each layer included in the recording medium 10. The recording medium 10 is, for example, a reversible recording medium on which writing (drawing) and erasing of information are possible. The recording medium 10 may be, for example, an irreversible recording medium on which writing (drawing) of information is possible only once and erasing is not possible. The recording medium 10 includes a plurality of recording layers 13, 15, and 17 having different developed color tones from each other. The recording medium 10 has, for example, a structure in which a base layer 12, the recording layer 13, a heat-insulating layer 14, the recording layer 15, a heat-insulating layer 16, the recording layer 17, and a protective layer 18 are stacked in this order on a base material 11. The protective layer 18 is disposed at a position opposed to the base material 11 with the base layer 12, the recording layer 13, the heat-insulating layer 14, the recording layer 15, the heat-insulating layer 16, and the recording layer 17 interposed therebetween. The protective layer 18 may be disposed on an outermost surface of the recording medium 10, or a layer other than the protective layer 18 may be disposed on the outermost surface of the recording medium 10.

The three recording layers 13, 15, and 17 are disposed in order of the recording layer 13, the recording layer 15, and the recording layer 17 from side of the base material 11. The two heat-insulating layers 14 and 16 are disposed in order of the heat-insulating layer 114a and the heat-insulating layer 16 from side of the base material 11. The base layer 12 is formed in contact with a surface of the base material 11. The protective layer 18 is formed on the outermost surface of the recording medium 10.

The base material 11 supports each of the recording layers 13, 15, and 17, and each of the heat-insulating layers 14 and 16. The base material 11 functions as a substrate having a surface over which each layer is to be formed. The base material 11 may allow or may not allow light to be transmitted therethrough. In a case where light is not transmitted, a color of the surface of the base material 11 may be, for example, white or a color other than white.

The base material 11 may be a card or a film. The base material 11 may have one main surface, on side where the recording layer 13 and the like are provided, on which a figure, a picture, a photograph, a character, a combination of two of them, or the like is printed. The base material 11 includes, for example, plastic. The base material 11 may include at least one kind selected from a group including a colorant, an antistatic agent, a flame retardant, a surface modifier, and the like, as necessary.

The plastic used for the base material 11 include, for example, at least one kind selected from a group including an ester-based resin, an amide-based resin, an olefin-based resin, a vinyl-based resin, an acrylic-based resin, an imide-based resin, a styrene-based resin, engineering plastic, and the like. In a case where the base material 11 includes two or more kinds of the resins, the two or more kinds of the resins may be mixed, copolymerized, or stacked.

The ester-based resin described above includes, for example, at least one kind selected from a group including polyethylene terephthalate (PET), polybutylene terephthalate (PBT), polyethylene naphthalate (PEN), a polyethylene terephthalate-isophthalate copolymer, a terephthalic acid-cyclohexane dimethanol-ethylene glycol copolymer, and the like. The amide-based resin described above includes, for example, at least one kind selected from a group including nylon 6, nylon 66, nylon 610, and the like. The olefin-based resin described above includes, for example, at least one kind selected from a group including polyethylene (PE), polypropylene (PP), polymethylpentene (PMP), and the like. The vinyl-based resin described above includes, for example, polyvinyl chloride (PVC).

The acrylic-based resin described above includes, for example, at least one kind selected from a group including polyacrylate, polymethacrylate, polymethyl methacrylate (PMMA), and the like. The imide-based resin described above includes, for example, at least one kind selected from a group including polyimide (PI), polyamideimide (PAI), polyetherimide (PEI), and the like. The styrene-based resin described above includes, for example, at least one kind selected from a group including polystyrene (PS), high-impact polystyrene, an acrylonitrile-styrene resin (AS resin), an acrylonitrile-butadiene-styrene resin (ABS resin), and the like. The engineering plastic described above includes, for example, at least one kind selected from a group including polycarbonate (PC), polyarylate (PAR), polysulfone (PSF), polyethersulfone (PES), polyphenylene ether (PPE), polyphenylene sulfide (PPS), polyetherketone (PEK), polyether ether ketone (PEEK), polyphenylene oxide (PPO), polyether sulfite, and the like.

The base layer 12 has a function of improving adhesion between the recording layer 13 and the base material 11. The base layer 12 includes, for example, a material that allows light to be transmitted therethrough. It is to be noted that a moisture-resistant barrier layer or a light-resistant barrier layer may be provided above or below the base layer 12 or the base material 11. In addition, a heat-insulating layer may be provided between the base layer 12 and the recording layer 13.

The three recording layers 13, 15, and 17 are able to reversibly change states between a color-developed state and a decolored state. The three recording layers 13, 15, and 17 may have, for example, such irreversibility that once the state changes from the decolored state to the color-developed state, the state does not return to the decolored state. The three recording layers 13, 15, and 171 are configured so that the colors in the color-developed states are different from each other. Each of the three recording layers 13, 15, and 17 includes a coloring compound, a photothermal conversion agent, and a color developing/reducing agent. The three recording layers 13, 15, and 17 include coloring compounds different from each other, and photothermal conversion agents different from each other. In the three recording layers 13, 15, and 17, the coloring compound, the photothermal conversion agent, and the color developing/ reducing agent are dispersed in a polymer material.

As the coloring compound, for example, a leuco dye is used. The leuco dye is combined with the color developing/ reducing agent by heat to turn into the color-developed state or separated from the color developing/reducing agent to turn into the decolored state. The developed color tone of the leuco dye included in each of the recording layers 13, 15, and 17 is different for each of the recording layers 13, 15, and 17. The leuco dye included in the recording layer 13 is combined with the color developing/reducing agent by heat to develop a magenta color. The leuco dye included in the recording layer 15 is combined with the color developing/ reducing agent by heat to develop a cyan color. The leuco dye included in the recording layer 17 is combined with the color developing/reducing agent by heat to develop a yellow color. The positional relationship among the three recording layers 13, 15, and 17 is not limited to the examples described above. In addition, the three recording layers 13, 15, and 17 are transparent in the decolored state. Thus, the recording medium 10 is able to record an image using colors of a wide color gamut.

The photothermal conversion agent absorbs light in a predetermined wavelength region of the near-infrared region and generates heat. It is to be noted that in this specification, the near-infrared region refers to a wavelength band of 700 nm to 2500 nm. It is preferable to select photothermal conversion agents having light absorption bands that are narrow in the near-infrared region and do not overlap each other in the recording layers 13, 15, and 17.

The heat-insulating layer 14 makes it difficult for heat to transfer between the recording layer 13 and the recording layer 15. The heat-insulating layer 16 makes it difficult for heat to transfer between the recording layer 15 and the recording layer 17. The protective layer 18 protects the surface of the recording medium 10 and functions as an overcoat layer of the recording medium 10. The heat-insulating layers 14 and 16, and the protective layer 18 each include a transparent material. The recording medium 10 may include, for example, a resin layer with relatively high rigidity (e.g., a PEN resin layer) immediately below the protective layer 18. It is to be noted that the protective layer 18 may include a moisture-resistant barrier layer or a light-resistant barrier layer. In addition, the protective layer 18 may include any functional layer.

Examples of the leuco dye include existing dyes for thermal paper. One specific example thereof is a compound including, for example, a group having an electron donating property in a molecule. The compound is represented by the following Chem. 1.

[Chem. 1]

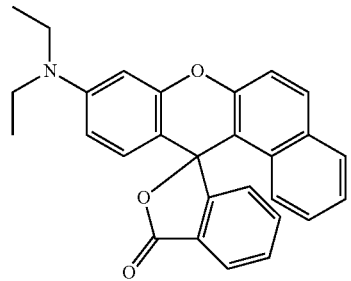

The coloring compound is not specifically limited, and may be appropriately selected depending on purposes. In addition to the compound represented by Chem. 1 described above, examples of specific coloring compounds include a fluoran-based compound, a triphenylmethane phthalide-based compound, an azaphthalide-based compound, a phenothiazine-based compound, a leuco auramine-based compound, an indolinophthalide-based compound, and the like. In addition to these materials, the examples include 2-anilino-3-methyl-6-diethylaminofluoran, 2-anilino-3-methyl-6-di(n-butylamino)fluoran, 2-anilino-3-methyl-6-(N-n-propyl-N-methylamino)fluoran, 2-anilino-3-methyl-6-(N-isopropyl-N-methylamino)fluoran, 2-anilino-3-methyl-6-(N-isobutyl-N-methylamino)fluoran, 2-anilino-3-methyl-6-(N-n-amyl-N-methylamino)fluoran, 2-anilino-3-methyl-6-(N-sec-butyl-N-methylamino)fluoran, 2-anilino-3-methyl-6-(N-n-amyl-N-ethyl amino)fluoran, 2-anilino-3-methyl-6-(N-iso-amyl-N-ethylamino)fluoran, 2-anilino-3-methyl-6-(N-n-propyl-N-isopropylamino)fluoran, 2-anilino-3-methyl-6-(N-cyclohexyl-N-methylamino)fluoran, 2-anilino-3-methyl-6-(N-ethyl-p-toluidino)fluoran, 2-anilino-3-methyl-6-(N-methyl-p-toluidino)fluoran, 2-(m-trichloromethylanilino)-3-methyl-6-diethylaminofluoran, 2-(m-trifluloromethylanilino)-3-methyl-6-diethylaminofluoran, 2-(m-trichloromethylanilino)-3-methyl-6-(N-cyclohexyl-N-methylamino)fluoran, 2-(2,4-dimethylanilino)-3-methyl-6-diethylaminofluoran, 2-(N-ethyl-p-toluidino)-3-methyl-6-(N-ethylanilino)fluoran, 2-(N-ethyl-p-toluidino)-3-methyl-6-(N-propyl-p-toluidino)fluoran, 2-anilino-6-(N-n-hexyl-N-ethylamino)fluoran, 2-(o-chloroanilino)-6-diethylaminofluoran, 2-(o-chloroanilino)-6-dibutylaminofluoran, 2-(m-trifluoromethylanilino)-6-diethylaminofluoran, 2,3-dimethyl-6-dimethylaminofluoran, 3-methyl-6-(N-ethyl-p-toluidino)fluoran, 2-chloro-6-diethylaminofluoran, 2-bromo-6-diethylaminofluoran, 2-chloro-6-dipropylaminofluoran, 3-chloro-6-cyclohexylaminofluoran, 3-bromo-6-cyclohexylaminofluoran, 2-chloro-6-(N-ethyl-N-isoamylamino)fluoran, 2-chloro-3-methyl-6-diethylaminofluoran, 2-anilino-3-chloro-6-diethylaminofluoran, 2-(o-chloroanilino)-3-chloro-6-cyclohexylaminofluoran, 2-(m-trifluoromethylanilino)-3-chloro-6-diethylaminofluoran, 2-(2,3-dichloroanilino)-3- chloro-6-diethylaminofluoran, 1,2-benzo-6-diethylaminofluoran, 3-diethylamino-6-(m-trifluoromethylanilino)fluoran, 3-(1-ethyl-2-methylindole-3-yl)-3-(2-ethoxy-4-diethylaminophenyl)-4-azaphthalide, 3-(1-ethyl-2-methylindole-3-yl)-3-(2-ethoxy-4-diethylaminophenyl)-7-azaphthalide, 3-(1-octyl-2-methylindole-3-yl)-3-(2-ethoxy-4-diethylaminophenyl)-4-azaphthalide, 3-(1-ethyl-2-methylindole-3-yl)-3-(2-methyl-4-diethylaminophenyl)-4-azaphthalide, 3-(1-ethyl-2-methylindole-3-yl)-3-(2-methyl-4-diethylaminophenyl)-7-azaphthalide, 3-(1-ethyl-2-methylindole-3-yl)-3-(4-diethylaminophenyl)-4-azaphthalide, 3-(1-ethyl-2-methylindole-3-yl)-3-(4-N-n-amyl-N-methylaminophenyl)-4-azaphthalide, 3-(1-methyl-2-methylindole-3-yl)-3-(2-hexyloxy-4-diethylaminophenyl)-4-azaphthalide, 3,3-bis(2-ethoxy-4-diethylaminophenyl)-4-azaphthalide, 3,3-bis(2-ethoxy-4-diethylaminophenyl)-7-azaphthalide, 2-(p-acetylanilino)-6-(N-n-amyl-N-n-butylamino)fluoran, 2-benzylamino-6-(N-ethyl-p-toluidino)fluoran, 2-benzylamino-6-(N-methyl-2,4-dimethylanilino)fluoran, 2-benzylamino-6-(N-ethyl-2,4-dimethylanilino)fluoran, 2-benzylamino-6-(N-methyl-p-toluidino)fluoran, 2-benzylamino-6-(N-ethyl-p-toluidino)fluoran, 2-(di-p-methylbenzylamino)-6-(N-ethyl-p-toluidino)fluoran, 2-(α-phenylethylamino)-6-(N-ethyl-p-toluidino)fluoran, 2-methylamino-6-(N-methylanilino)fluoran, 2-methylamino-6-(N-ethylanilino)fluoran, 2-methylamino-6-(N-propylanilino)fluoran, 2-ethylamino-6-(N-methyl-p-toluidino)fluoran, 2-methylamino-6-(N-methyl-2,4-dimethylanilino)fluoran, 2-ethylamino-6-(N-ethyl-2,4-dimethylanilino)fluoran, 2-dimethylamino-6-(N-methylanilino)fluoran, 2-dimethylamino-6-(N-ethylanilino) fluoran, 2-di ethyl amino-6-(N-m ethyl-p-toluidino)fluoran, 2-diethylamino-6-(N-ethyl-p-toluidino)fluoran, 2-dipropylamino-6-(N-methylanilino)fluoran, 2-dipropylamino-6-(N-ethylanilino)fluoran, 2-amino-6-(N-methylanilino)fluoran, 2-amino-6-(N-ethylanilino)fluoran, 2-amino-6-(N-propylanilino)fluoran, 2-amino-6-(N-methyl-p-toluidino)fluoran, 2-amino-6-(N-ethyl-p-toluidino)fluoran, 2-amino-6-(N-propyl-p-toluidino)fluoran, 2-amino-6-(N-methyl-p-ethylanilino)fluoran, 2-amino-6-(N-ethyl-p-ethylanilino)fluoran, 2-amino-6-(N-propyl-p-ethylanilino)fluoran, 2-amino-6-(N-methyl-2,4-dimethylanilino)fluoran, 2-amino-6-(N-ethyl-2,4-dimethylanilino)fluoran, 2-amino-6-(N-propyl-2,4-dimethylanilino)fluoran, 2-amino-6-(N-methyl-p-chloroanilino)fluoran, 2-amino-6-(N-ethyl-p-chloroanilino)fluoran, 2-amino-6-(N-propyl-p-chloroanilino)fluoran, 1,2-benzo-6-(N-ethyl-N-isoamylamino)fluoran, 1,2-benzo-6-dibutylaminofluoran, 1,2-benzo-6-(N-methyl-N-cyclohexylamino)fluoran, 1,2-benzo-6-(N-ethyl-N-toluidino)fluoran, and the like. For the recording layers 13, 15, and 17, as the coloring compound, one kind of the compounds described above may be used alone, or two or more kinds of the compounds described above may be used in combination.

The color developing/reducing agent develops a color of a colorless coloring compound or decolors a coloring compound colored in a predetermined color. Examples of the color developing/reducing agent include a phenol derivative, a salicylic acid derivative, a urea derivative, and the like. Specific examples of the color developing/reducing agent may include a compound represented by the following Chem. 2.

[Chem. 2]

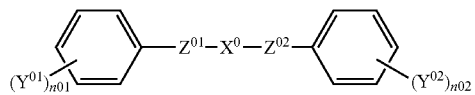

(where, in a formula (3), $X^0$ represents a bivalent group including at least one benzene ring and in a case where $X^0$ includes at least two benzene rings, at least two benzene rings are optionally condensed, and an example thereof may be naphthalene, anthracene, or the like, $Y^{01}$ and $Y^{02}$ each independently represent a univalent group, n01 and n02 each independently represent an integer of any of 0 to 5, in a case where n01 represents an integer of any of 2 to 5 $Y^{01}$s may be the same as or different from each other, and in a case where n02 represents an integer of any of 2 to 5, $y^{02}$s may be the same as or different from each other, and $Z^{01}$ and $Z^{02}$ each independently represent a hydrogen-bonding group.)

A color developing agent may include, for example, a compound represented by the following Chem. 3.

[Chem. 3]

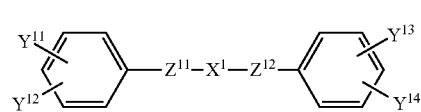

(where, in Chem. 3, $X^1$ represents a bivalent group including at least one benzene ring, $Y^{11}$, $Y^{12}$, $Y^{13}$, and $Y^{14}$ each independently represent a univalent group, and $Z^{11}$ and $Z^{12}$ each independently represent a hydrogen-bonding group.)

In a case where Chem. 2 and Chem. 4 each include a hydrocarbon group, the hydrocarbon group is a generic name of a group including carbon (C) and hydrogen (H), and may be a saturated hydrocarbon group or an unsaturated hydrocarbon group. The saturated hydrocarbon group is an aliphatic hydrocarbon group having no carbon-carbon multiple bond, and the unsaturated hydrocarbon group is an aliphatic hydrocarbon group having a carbon-carbon multiple bond (a carbon-carbon double bond or a carbon-carbon triple bond).

In a case where Chem. 2 and Chem. 3 each include a hydrocarbon group, the hydrocarbon group may be a chain hydrocarbon group or a hydrocarbon group including one, or two or more rings. The chain hydrocarbon group may be a straight-chain hydrocarbon group, or a branched hydrocarbon group including one, or two or more side chains.

($X^0$ and $X^1$ Including One Benzene Ring)

Each of $X^0$ in Chem. 2 and $X^1$ in Chem. 3 represents, for example, a bivalent group including one benzene ring. The bivalent group is represented by the following Chem. 4, for example.

[Chem. 4]

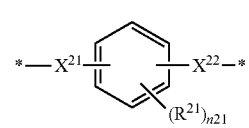

(where, in Chem. 4, presence of $X^{21}$ is optional and in a case where $X^{21}$ is present, $X^{21}$ represents a bivalent group, presence of $X^{22}$ is optional and in a case where $X^{22}$ is present, $X^{22}$ represents a bivalent group, $R^{21}$ represents a univalent group, n21 represents an integer of any of 0 to 4 and in a case where n21 represents an integer of any of 2 to 4, $R^{21}$s may be the same as or different from each other, and a* mark represents a bond part.)

In Chem. 4, binding positions of X 21 and X 22 to the benzene ring are not limited. In other words, the binding positions of $X^{21}$ and $X^{22}$ to the benzene ring may be any of an ortho position, a meta position, and a para position.

It is preferable that the bivalent group including one benzene ring described above be represented by the following Chem. 5 in terms of improvement in high-temperature high-humidity storage characteristics.

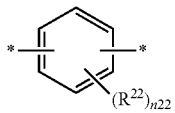

[Chem. 5]

(where, in Chem. 5, $R^{22}$ represents a univalent group, n22 represents an integer of any of 0 to 4 and in a case where n22 represents an integer of any of 2 to 4, $R^{22}$s may be the same as or different from each other, and a * mark represents a bond part.)

In a case where $X^0$ in Chem. 2 represents a bivalent group including one benzene ring, in Chem. 5, binding positions of $Z^{01}$ and $Z^{02}$ to the benzene ring are not limited. In other words, the binding positions of $Z^{01}$ and $Z^{02}$ to the benzene ring may be any of an ortho position, a meta position, and a para position.

In a case where $X^1$ in Chem. 3 represents a bivalent group including one benzene ring, in Chem. 5, binding positions of $Z^{11}$ and $Z^{12}$ to the benzene ring is not limited. In other words, the binding positions of $Z^{11}$ and $Z^{12}$ to the benzene ring may be any of an ortho position, a meta position, and a para position.

$X^{21}$ and $X^{22}$

It is sufficient that $X^{21}$ and $X^{22}$ in Chem. 4 each independently represent a bivalent group. One example thereof is a hydrocarbon group that optionally includes a substituent group. The hydrocarbon group is preferably a chain hydrocarbon group, and specifically preferably a normal alkyl chain.

The carbon number in the hydrocarbon group that optionally includes a substituent group is, for example, 1 or more and 15 or less, 1 or more and 13 or less, 1 or more and 12 or less, 1 or more and 10 or less, 1 or more and 6 or less, or 1 or more and 3 or less.

In a case where each of $X^{21}$ and $X^{22}$ represents a normal alkyl group, the carbon number in the normal alkyl group is preferably 8 or less, more preferably 6 or less, still more preferably 5 or less, and specifically preferably 3 or less in terms of high-temperature storage stability. In a case where the carbon number in the normal alkyl group is 8 or less, the length of the normal alkyl group is short. Conceivably, this makes it difficult to cause thermal disturbance in a color developing agent during high-temperature storage, and makes it difficult to separate a part interacting with a coloring compound such as a leuco dye during color development. This makes it difficult to decolor the coloring compound such as a leuco dye during high-temperature storage, which improves high-temperature storage stability.

Examples of a substituent group that optionally includes a hydrocarbon group include a halogen group (e.g., a fluorine group), an alkyl group including a halogen group (e.g., a fluorine group), and the like. The hydrocarbon group that optionally includes a substituent group may be a hydrocarbon group in which a part of carbon (e.g., a part of carbon included in a main chain of the hydrocarbon group) is substituted by an element such as oxygen.

($R^{21}$)

It is sufficient that $R^{21}$ in Chem. 4 represents a univalent group, and $R^{21}$ is not specifically limited. One example thereof is a halogen group or a hydrocarbon group that optionally includes a substituent group.

Examples of the halogen group include a fluorine group (—F), a chlorine group (—Cl), a bromine group (—Br), and an iodine group (—I).

The carbon number in the hydrocarbon group that optionally includes a substituent group is, for example, one or more and 15 or less, 1 or more and 13 or less, 1 or more and 12 or less, 1 or more and 10 or less, 1 or more and 6 or less, or 1 or more and 3 or less.

Example of a substituent group that optionally includes a hydrocarbon group include a halogen group (e.g., a fluorine group), an alkyl group including a halogen group (e.g., a fluorine group), and the like. The hydrocarbon group that optionally includes a substituent group may be a hydrocarbon group in which a part of carbon (e.g., a part of carbon included in a main chain of the hydrocarbon group) is substituted by an element such as oxygen.

($R^{22}$)

It is sufficient that $R^{22}$ in Chem. 5 represents a univalent group, and $R^{22}$ is not specifically limited. One example thereof is a halogen group or a hydrocarbon group that optionally includes a substituent group. The halogen group and the hydrocarbon group that optionally includes a substituent group are respectively similar to the halogen group and the hydrocarbon group that optionally includes a substituent group in $R^{21}$ in Chem. 2.

($X^0$ and $X^1$ Including Two Benzene Rings)

Each of $X^0$ in Chem. 2 and $X^1$ in Chem. 3 represents, for example, a bivalent group including two benzene rings. The bivalent group is represented by the following Chem. 6, for example.

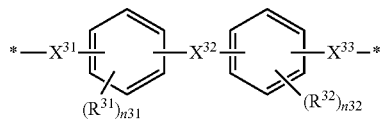

[Chem. 6]

(where, in Chem. 6, presence of $X^{31}$ is optional and in a case where $X^{31}$ is present, $X^{31}$ represents a bivalent group, presence of $X^{32}$ is optional and in a case where $X^{32}$ is present, $X^{32}$ represents a bivalent group, presence of $X^{33}$ is optional and in a case where $X^{33}$ is present, $X^{33}$ represents a bivalent group, $R^{31}$ and $R^{32}$ each independently a univalent group, n31 and n32 each independently represent an integer of any of 0 to 4, in a case where n31 represents an integer of any of 2 to 4, R 31 s may be the same as or different from each other, and in a case where n32 represents an integer of any of 2 to 4, R 32 s may be the same as or different from each other, and a * mark represents a bond part.)

In Chem. 6, binding positions of $X^{31}$ and $X^{32}$ to the benzene ring are not limited. In other words, the binding positions of $X^{31}$ and $X^{32}$ to the benzene ring may be any of an ortho position, a meta position, and a para position. Similarly, in Chem. 6, binding positions of $X^{32}$ and $X^{33}$ to the benzene ring are not limited. In other words, the binding positions of $X^{32}$ and $X^{33}$ to the benzene ring may be any of an ortho position, a meta position, and a para position.

The bivalent group including two benzene rings described above is preferably represented by the following Chem. 7 in terms of improvement in high-temperature high-humidity storage characteristics.

[Chem. 7]

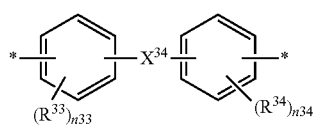

(where, in Chem. 7, $X^{34}$ represents a bivalent group, $R^{33}$ and $R^{34}$ each independently represent a univalent group, n33 and n34 each independently represent an integer of any of 0 to 4, in a case where n33 represents an integer of any of 2 to 4, $R^{33}$ may be the same as or different from each other, and in a case where n34 represents an integer of any of 2 to 4, $R^{34}$ may be the same as or different from each other, and a * mark represents a bond part.)

In a case where $X^0$ in Chem. 2 represents a bivalent group including two benzene rings, in Chem. 7, binding positions of $Z^{01}$ and $X^{34}$ to the benzene ring are not limited. In other words, the binding positions of $Z^{01}$ and $X^{34}$ to the benzene ring may be any of an ortho position, a meta position, and a para position. Similarly, in Chem. 7, binding positions of $Z^{02}$ and $X^{34}$ to the benzene ring are not limited. In other words, the binding positions of $Z^{02}$ and $X^{34}$ to the benzene ring may be any of an ortho position, a meta position, and a para position.

In a case where $X^1$ in Chem. 3 represents a bivalent group including two benzene rings, in Chem. 7, binding positions of $Z^{11}$ and $X^{34}$ to the benzene ring are not limited. In other words, the binding positions of $Z^{11}$ and $X^{34}$ to the benzene ring may be any of an ortho position, a meta position, and a para position. Similarly, in Chem. 7, binding positions of $Z^{12}$ and $X^{34}$ to the benzene ring are not limited. In other words, the binding positions of $Z^{12}$ and $X^{34}$ to the benzene ring may be any of an ortho position, a meta position, and a para position.

($X^{31}$, $X^{32}$, and $X^{33}$)

It is sufficient that $X^{31}$, $X^{32}$, and $X^{33}$ in Chem. 6 each independently represent a bivalent group, and $X^{31}$, $X^{32}$, and $X^{33}$ are not specifically limited. One example thereof is a hydrocarbon group that optionally includes a substituent group. The hydrocarbon group is similar to those in $X^{21}$ and $X^{22}$ in Chem. 4 described above.

($X^{34}$)

It is sufficient that $X^{34}$ in Chem. 7 represents a bivalent group, and $X^{34}$ is not specifically limited. One example thereof is a hydrocarbon group that optionally includes a substituent group. The hydrocarbon group is similar to those in $X^{21}$ and $X^{22}$ in Chem. 4 described above.

($R^{31}$ and $R^{32}$)

It is sufficient that $R^{31}$ and $R^{32}$ in Chem. 6 each represent a univalent group, and $R^{31}$ and $R^{32}$ are not specifically limited. One example thereof is a halogen group or a hydrocarbon group that optionally includes a substituent group. The halogen group and the hydrocarbon group that optionally includes a substituent group are respectively similar to the halogen group and the hydrocarbon group that optionally includes a substituent group in $R^2$ in Chem. 4 described above.

($R^{33}$ and $R^{34}$)

It is sufficient that $R^{33}$ and $R^{34}$ in Chem. 7 each represent a univalent group, and $R^{33}$ and $R^{34}$ are not specifically limited. One example thereof is a halogen group or a hydrocarbon group that optionally includes a substituent group. The halogen group and the hydrocarbon group that optionally includes a substituent group are respectively similar to the halogen group and the hydrocarbon group that optionally includes a substituent group in $R^{21}$ in Chem. 4 described above.

($Y^{01}$ and $Y^{02}$)

$Y^{01}$ and $Y^{02}$ in Chem. 2 each independently represent, for example, a hydrogen group (—H), a hydroxy group (—OH), a halogen group (—X), a carboxylic group (—COOH), an ester group (—COOR), or a hydrocarbon group that optionally includes a substituent group.

Examples of the halogen group include a fluorine group (—F), a chlorine group (—Cl), a bromine group (—Br), and an iodine group (—I).

The carbon number in the hydrocarbon group that optionally includes a substituent group is, for example, 1 or more and 15 or less, 1 or more and 13 or less, 1 or more and 12 or less, 1 or more and 10 or less, 1 or more and 6 or less, or 1 or more and 3 or less.

Example of a substituent group that optionally includes a hydrocarbon group include a halogen group (e.g., a fluorine group), an alkyl group including a halogen group (e.g., a fluorine group), and the like. The hydrocarbon group that optionally includes a substituent group may be a hydrocarbon group in which a part of carbon (e.g., a part of carbon included in a main chain of the hydrocarbon group) is substituted by an element such as oxygen.

In Chem. 2, it is preferable that one of $(Y^{01})_{n01}$ and/or one of $(Y^{02})_{n02}$ represent a hydroxy group (—OH). One of $(Y^{01})_{n01}$ and/or one of $(Y^{02})_{n02}$ representing a hydroxy group (—OH) makes it possible to improve display quality and light resistance.

($Y^{11}$, $Y^{12}$, $Y^{13}$, and $Y^{14}$)

In Chem. 3, binding positions of $Y^{11}$ and $Y^{12}$ to the benzene ring are not specifically limited. In other words, the binding positions of $Y^{11}$ and $Y^{12}$ to the benzene ring may be any of an ortho position, a meta position, and a para position. Similarly, in Chem. 3, binding positions of $Y^{13}$ and $Y^{14}$ to the benzene ring are not specifically limited. In other words, the binding positions of $Y^{13}$ and $Y^{14}$ to the benzene ring may be any of an ortho position, a meta position, and a para position. In Chem. 3, the binding positions of and $Y^{12}$ to one benzene and the binding positions of $Y^{13}$ and $Y^{14}$ to the other benzene may be the same as or different from each other.

$Y^{11}$, $Y^{12}$, $Y^{13}$, and $Y^{14}$ in Chem. 3 each independently represent, for example, a hydrogen group (—H), a hydroxy group (—OH), a halogen group, a carboxylic group (—COOH), an ester group (—COOR), or a hydrocarbon group that optionally includes a substituent group. The halogen group or the hydrocarbon group that optionally includes a substituent group are respectively similar to the halogen group and the hydrocarbon group that optionally includes a substituent group in $Y^{01}$ and $Y^{02}$ in Chem. 2 described above.

In Chem. 3, it is preferable that $Y^{11}$ and/or $Y^{13}$ represent a hydroxy group (—OH). In Chem. 3, $Y^{11}$ and/or $Y^{13}$ representing a hydroxy group (—OH) makes it possible to improve display quality and light resistance.

($Z^{01}$ and $Z^{02}$)

$Z^{01}$ and $Z^{02}$ in Chem. 2 each independently represent, for example, a urea bond (—NHCONH—), an amide bond (—NHCO— or —OCHN—), or a hydrazide bond (—NHCOCONH—). In terms of improvement in high-temperature high-humidity storage characteristics, it is preferable that $Z^{01}$ and $Z^{02}$ each represent a urea bond. In a case where $Z^{01}$ represents an amide bond, nitrogen included in the amide bond may be bound to benzene, or carbon included in the amide bond may be bound to benzene. In a case where $Z^{02}$ represents an amide bond, nitrogen included in the amide bond may be bound to benzene, or carbon included in the amide bond may be bound to benzene.

($Z^{11}$ and $Z^{12}$)

$Z^{11}$ and $Z^{12}$ in Chem. 3 each independently represent, for example, a urea bond (—NHCONH—), an amide bond (—NHCO— or —OCHN—), or a hydrazide bond (—NHCOCONH—). In terms of improvement in high-temperature high-humidity storage characteristics, it is preferable that $Z^{01}$ and $Z^{02}$ each represent a urea bond. In a case where $Z^{11}$ represents an amide bond, nitrogen included in the amide bond may be bound to benzene, or carbon included in the amide bond may be bound to benzene. In a case where $Z^{12}$ represents an amide bond, nitrogen included in the amide bond may be bound to benzene, or carbon included in the amide bond may be bound to benzene.

In addition to those materials, examples of the color developing/reducing agent include 4,4'-isopropylidene bisphenol, 4,4'-isopropylidene bis(o-methylphenol), 4,4'-secondary-butylidenebisphenol, 4,4'-isopropylidene bis(2-tertiary-butylphenol), zinc p-nitrobenzoate, 1,3,5-tris(4-tertiary-butyl-3-hydroxy-2,6-dimethylbenzyl)isocyanurate, 2,2-(3,4'-dihydroxydiphenyl)propane, bis(4-hydroxy-3-methylphenyl)sulfide, 4-{β-(p-methoxyphenoxy)ethoxy}salicylate, 1,7-bis(4-hydroxyphenylthio)-3,5-dioxaheptane, 1,5-bis(4-hydroxyphenylthio)-5-oxapentane, monobenzylester phthalate monocalcium salt, 4,4'-cyclohexylidenediphenol, 4,4'-isopropylidene bis(2-chlorophenol), 2,2'-methylenebis(4-methyl-6-tertiary-butylphenol), 4,4'-butylidenebis(6-tertiary-butyl-2-methyl)phenol, 1,1,3-tris(2-methyl-4-hydroxy-5-tertiary-butylphenyl)butane, 1,1,3-tris(2-methyl-4-hydroxy-5-cyclohexylphenyl)butane, 4,4-thiobis(6-tertiary-butyl-2-methyl)phenol, 4,4'-diphenolsulfone, 4-isopropoxy-4'-hydroxydiphenyl sulfone (4-hydroxy 4'-isopropoxydiphenyl sulfone), 4-benzyloxy-4'-hydroxydiphenyl sulfone, 4,4'-diphenol sulfoxide, isopropyl p-hydroxybenzoate, benzyl p-hydroxybenzoate, benzyl protocatechuate, stearyl gallate, lauryl gallate, octyl gallate, 1,3-bis(4-hydroxyphenylthio)-propane, N,N'-diphenylthiourea, N,N'-di (m-chlorophenyl)thiourea, salicylanilide, bis (4-hydroxyphenyl)acetic acid methyl ester, bis(4-hydroxyphenyl)acetic acid benzyl ester, 1,3-bis(4-hydroxycumyl)benzene, 1,4-bis(4-hydroxycumyl)benzene, 2,4'-diphenolsulfone, 2,2'-diallyl-4,4'-diphenolsulfone, 3,4-dihydroxyphenyl-4'-methyldiphenyl sulfone, 1-acetyloxy-2-zinc naphthoate, 2-acetyloxy-1-zinc naphthoate, 2-acetyloxy-3-zinc naphthoate, α,α-bis(4-hydroxyphenyl)-α-methyltoluene, antipyrine complex of zinc thiocyanate, tetrabromobisphenol A, tetrabromobisphenol S, 4,4'-thiobis (2-methylphenol), 4,4'-thiobis(2-chlorophenol), dodecylphosphonic acid, tetradecylphosphonic acid, hexadecylphosphonic acid, octadecylphosphonic acid, eicosylphosphonic acid, docosylphosphonic acid, tetracosylphosphonic acid, hexacosylphosphonic acid, octacosylphosphonic acid, α-hydroxydodecylphosphonic acid, α-hydroxytetradecylphosphonic acid, α-hydroxyhexadecylphosphonic acid, α-hydroxyoctadecylphosphonic acid, α-hydroxyeicosylphosphonic acid, α-hydroxydocosylphosphonic acid, α-hydroxytetracosylphosphonic acid, dihexadecyl phosphate, dioctadecyl phosphate, dieicosyl phosphate, didocosyl phosphate, monohexadecyl phosphate, monooctadecyl phosphate, monoeicosyl phosphate, monodocosyl phosphate, methylhexadecyl phosphate, methyloctadecyl phosphate, methyleicosyl phosphate, methyldocosyl phosphate, amylhexadecyl phosphate, octylhexadecyl phosphate, laurylhexadecyl phosphate, and the like. For the recording layers 13, 15, and 17, as the coloring compound, one kind of the compounds described may be used alone, or two or more kinds of the compounds described above may be used in combination.

The photothermal conversion agent absorbs, for example, light in a predetermined wavelength region of the near infrared region and generate heat. As the photothermal conversion agent, for example, it is preferable to use, for example, a near-infrared absorbing dye that has an absorption peak within a wavelength range from 700 nm to 2500 nm both inclusive and hardly has absorption in a visible region. Specific examples thereof include a compound having a phthalocyanine framework (phthalocyanine-based dye), a compound having naphthalocyanine framework (naphthalocyanine-based dye), a compound having a squarylium framework (squarylium-based dye), a metal complex such as a dithio complex, a diimonium salt, an aminium salt, an inorganic compound, and the like. Examples of the inorganic compound include metal oxide such as graphite, carbon black, metal particle powder, tricobalt tetraoxide, iron oxide, chromium oxide, copper oxide, titanium black, and ITO, metal nitride such as niobium nitride, metal carbide such as tantalum carbide, metal sulfide, various kinds of magnetic powder, and the like. In addition to these materials, a compound that has a cyanine framework having superior light resistance and superior heat resistance (cyanine-based dye) may be used.

It is to be noted that superior light resistance means that no decomposition is not induced during laser irradiation. Superior heat resistance means that, for example, a film is formed together with a polymer material, and, for example, after the film is stored at 150° C. for 30 minutes, a maximum absorption peak value is not changed by 20% or more. Examples of such a compound having a cyanine framework include a compound including, in a molecule, at least one of a counter ion of any of $SbF_6$, $PF_6$, $BF_4$, $ClO_4$, $CF_3SO_3$, and $(CF_3SO_3)_2N$, or a methine chain including a five-membered ring or a six-membered ring.

The cyanine-based dye preferably includes both any of the counter ions described above, and a cyclic structure such as a five-membered ring and a six-membered ring in a methine chain; however, if the cyanine-based dye includes at least one of them, sufficient light resistance and sufficient heat resistance are secured. A material having superior light resistance and superior heat resistance is not decomposed during laser irradiation, as described above. Examples of a means of confirming light resistance include a method of measuring a change in a peak of an absorption spectrum during a xenon lamp irradiation test. In a case where a change rate during irradiation for 30 minutes is 20% or less, light resistance can be determined as being superior. Examples of a means of confirming heat resistance include a method of measuring change in a peak of an absorption spectrum during storage at 150° C. In a case where a change rate after a test for 30 minutes is 20% or less, heat resistance can be determined as being superior.

As the polymer material, a polymer material in which the coloring compound, the color developing/reducing agent, and the photothermal conversion agent are easily homogeneously dispersed is preferable. In addition, in order to obtain high visibility of information to be written to the recording layer 11, the polymer material preferably has high transparency, and, for example, a polymer material having high solubility in an organic solvent is preferable. Examples of the polymer material include a thermosetting resin and a thermoplastic resin. Specific examples thereof include polyvinyl chloride, polyvinyl acetate, a vinyl chloride-vinyl acetate copolymer, ethyl cellulose, polystyrene, a styrene-based copolymer, a phenoxy resin, polyester, aromatic polyester, polyurethane, polycarbonate, polyacrylic acid ester, polymethacrylic acid ester, an acrylic acid-based copolymer, a maleic acid-based polymer, polyvinyl alcohol, modified polyvinyl alcohol, hydroxyethyl cellulose, carboxymethyl cellulose, starch, and the like.

The recording layers 13, 15, and 17 each include at least one kind of the coloring compounds described above, at least one kind of the color developing/reducing agents described above, and at least one kind of the photothermal conversion agents described above. It is preferable that a ratio of the coloring compound and the color developing/reducing agent included in each of the recording layers 13, 15, and 17 be, for example, the coloring compound:the color developing/reducing agent=1:2 (weight ratio). The photothermal conversion agent is changed in accordance with film thicknesses of the recording layers 13, 15, and 17. In addition, the recording layers 13, 15, and 17 may include, for example, any of various kinds of additives such as a sensitizer and an ultraviolet absorber, in addition to the materials described above.

The protective layer 18 may have a function of suppressing mixing of one or both of water and oxygen into the recording layers 13, 15, and 17. The protective layer 18 covers a surface of the recording layer 17. The protective layer 18 preferably has, for example, a water vapor permeability of 0.001 $g/m^2/day$ or more and 10 $g/m^2/day$ or less. In addition, in order to obtain high visibility of information to be written to the recording layers 13, 15, and 17, the protective layer 18 preferably has high transparency, as with the polymer material included in the recording layers 13, 15, and 17. Examples of such a protective layer 18 include a stacked film in which an inorganic oxide film is provided on a base material including a plastic film. The protective layer 18 configured as a stacked film of the plastic film and the inorganic oxide film covers the recording layer 17 to cause the inorganic oxide film and the plastic film to be respectively disposed on the recording layer 17 side (inside) and outside.

As the plastic film serving as the base material, for example, it is possible to use, for example, an industrial plastic film, and it is possible to form the plastic film with use of, for example, at least one of polyethylene terephthalate (PET), polycarbonate (PC), or a polymethyl methacrylate (PMMA). The plastic film preferably has, for example, a thickness of 5 μm or more and 100 μm or less.

Examples of the inorganic oxide film include a single-layer film or a stacked film using at least one kind of a silicon oxide film ($SiO_x$ film), a aluminum oxide film ($AlO_x$ film), or a silicon nitride film ($SiN_x$ film) formed by a sputtering method, a chemical vapor deposition (CVD) method, or the like. The protective layer 18 preferably has, for example, a thickness of 10 nm or more and 1 μm or less.

Next, description is given of an example of writing of information in the drawing system 100 according to the present embodiment.

[Writing]

First, the user prepares the color-undeveloped recording medium 10 and places the recording medium 10 on the Y stage 57. Next, the user sends input image data described in the RGB color space from the terminal device to the drawing system 100 via the network. Upon receiving the input image data via the network, the drawing system 100 performs the following drawing process.

First, upon receiving the input image data via the communication section 110, the information processor 160 converts the input image data described in the RGB color space into leuco image data described in the leuco color space. Next, the information processor 160 derives a voltage value file (a list of command voltage values) on the basis of gradation values of respective colors of each drawing coordinate of the leuco image data obtained by the conversion. The information processor 160 transmits the derived voltage value file (the list of command voltage values) to the drawing section 150.

The signal processing circuit 51 of the drawing section 60 acquires the voltage value file (the list of command voltage values) inputted from the information processor 160 as an image signal Din. The signal processing circuit 51 generates, for example, from the image signal Din, an image signal corresponding to characteristics such as the wavelength of a laser light beam in synchronization with a scanner operation of the X scanner section 55. The signal processing circuit 51 generates a projection image signal such that the laser light beam is emitted according to the generated image signal. The signal processing circuit 51 outputs the generated projection image signal to the laser driving circuit 52 of the drawing section 150.

The laser driving circuit 52 drives the light sources 53A, 53B, and 53C of the light source section 53 in accordance with projection image signals corresponding to the respective wavelengths. In this case, the laser driving circuit 52 causes a laser light beam to be emitted from at least one light source out of the light source 53A, the light source 53B, and the light source 53C, for example, and to scan the recording medium 10.

For example, in a case of causing the recording layer 17 to develop a color, the recording layer 17 is irradiated with the laser light beam La having the light emission wavelength λ1 with such energy that the recording layer 17 reaches a color-developing temperature. Accordingly, the photothermal conversion agent included in the recording layer 17 generates heat to cause a color reaction (color-developing reaction) between the coloring compound and the color developing/reducing agent, thereby developing, for example, a yellow color in an irradiated portion. Likewise, in a case of causing the recording layer 15 to develop a color, the recording layer 15 is irradiated with the laser light beam Lb having the light emission wavelength λ2 with such energy that the recording layer 15 reaches a light-developing temperature to develop, for example, a cyan color in an irradiated portion. In a case of causing the recording layer 13 to develop a color, the recording layer 13 is irradiated with the laser light beam Lc having the light emission wavelength λ3 with such energy that the recording layer 13 reaches a color-developing temperature to develop, for example, a cyan color in an irradiated portion. Thus, irradiating any portion with a laser light beam having a corresponding wavelength makes it possible to record a figure or the like (e.g., a full-color figure or the like).

FIG. 4 illustrates a state of writing information on the recording medium 10 by the drawing system 150. FIG. 4 exemplifies a cross-sectional configuration of the recording medium 10, and further exemplifies a state in which the laser light beams La, Lb, and Lc perform scanning from the left to the right of the sheet at predetermined intervals ΔX1 and ΔX2.

In the present embodiment, a mechanism including the scanner driving circuit 54, the X scanner section 55, the Y stage driving circuit 56, and the Y stage 57 functions as a scanning section that irradiates the surface of the recording medium 10 with a plurality of laser light beams La, Lb, and Lc generated by the light source section 53 at the predetermined intervals $\Delta X1$ and $\Delta X2$. This mechanism further scans the surface of the recording medium 10 with the plurality of laser light beams La, Lb, and Lc in synchronization in the same direction. This mechanism scans the surface of the recording medium 10 with the plurality of laser light beams La, Lb, and Lc in a state in which a plurality of irradiation spots Pa, Pb, and Pc of the plurality of laser light beams La, Lb, and Lc is arranged side by side at predetermined intervals $\Delta X1$ and $\Delta X2$ in the same direction as the scanning direction (X-axis direction) of the plurality of laser light beams La, Lb, and Lc.

The interval $\Delta X1$ between the irradiation spot Pa of the laser light beam La and the irradiation spot Pb of the laser light beam Lb preferably has such a size that a high-temperature region Ra generated in and around the recording layer 13 by the laser light beam La and a high-temperature region Rb generated in and around the recording layer 15 by the laser light beam Lb do not overlap each other. In addition, the interval $\Delta X2$ between the irradiation spot Pb of the laser light beam Lb and the irradiation spot Pc of the laser light beam Lc preferably has such a size that the high-temperature region Rb generated in and around the recording layer 15 by the laser light beam Lb and a high-temperature region Rc generated in and around the recording layer 17 by the laser light beam Lc do not overlap each other.

It is to be noted that, as illustrated in FIG. 4, the order of scanning the surface of the recording medium 10 with the plurality of laser light beams La, Lb, and Lc may be, for example, order that allows colors to be developed in order from a layer closest to the outermost surface of the recording medium 10 out of the recording layers 13, 15, and 17. Alternatively, the order of scanning the surface of the recording medium 10 with the plurality of laser light beams La, Lb, and Lc may be, for example, order that allows colors to be developed in order from a layer closest to the base material 11 (a layer farthest from the outermost surface of the recording medium 10) out of the recording layers 13, 15, and 17.

Effects

Next, description is given of effects of the drawing system 100 according to the present embodiment in contrast with comparative examples. FIGS. 5 and 6 each illustrate a state of writing information on the recording medium 10 in the comparative example.

In the comparative example illustrated in FIG. 5, the same spot P1 (same pixel) of the recording medium 10 is irradiated with the laser light beams La, Lb, and Lc. Accordingly, the high-temperature region Ra and the high-temperature region Rb partially overlap each other, and the high-temperature region Rb and the high-temperature region Rc partially overlap each other. As a result, in the comparative example illustrated in FIG. 5, thermal crosstalk occurs between two recording layers adjacent in a stacking direction to cause unexpected writing or erasing. Accordingly, the comparative example illustrated in FIG. 5 has an issue that drawing quality is low.

In the comparative example illustrated in FIG. 6, the entire recording medium 10 is irradiated sequentially with the laser light beams La, Lb, and Lc. This prevent the high-temperature region Ra and the high-temperature region Rb from overlapping each other, and also prevents the high-temperature region Rb and the high-temperature region Rc from overlapping each other. Accordingly, in the comparative example illustrated in FIG. 6, drawing quality is favorable. However, drawing takes three times as long as drawing in the comparative example illustrated in FIG. 5.

Meanwhile, in the present embodiment, the surface of the recording medium 10 is irradiated with the plurality of laser light beams La, Lb, and Lc generated by the light source section 53 at the predetermined intervals $\Delta X1$ and $\Delta X2$, and the surface of the recording medium 10 is scanned with the plurality of laser light beams La, Lb, and Lc in synchronization in the same direction. This makes it possible to reduce occurrence of thermal crosstalk between the recording layers 13 and 15 adjacent in the stacking direction and between the recording layer 15 and 17 adjacent in the stacking direction. As a result, it is possible to reduce a possibility that unexpected writing and erasing occur.

In addition, in the present embodiment, the surface of the recording medium 10 is scanned with the plurality of laser light beams La, Lb, and Lc in a state in which the irradiation spots Pa, Pb, and Pc are arranged side by side at the predetermined intervals $\Delta X1$ and $\Delta X2$ in the same direction as the scanning direction (X-axis direction) of the plurality of laser light beams La, Lb, and Lc. This makes it possible to reduce occurrence of thermal crosstalk between the recording layers 13 and 15 adjacent in the stacking direction and between the recording layer 15 and 17 adjacent in the stacking direction. As a result, it is possible to reduce a possibility that unexpected writing and erasing occur.

In addition, in the present embodiment, a mechanism of scanning with the plurality of laser light beams La, Lb, and Lc in the X-axis direction and the Y stage 47 that moves the recording medium 10 in the Y-axis direction are provided. This makes it possible to implement raster-scanning while reducing occurrence of thermal crosstalk.

In addition, in the present embodiment, raster-scanning is executed by scanning with the plurality of laser light beams La, Lb, and Lc in the X-axis direction and moving the Y stage 47 in the Y-axis direction. This makes it possible to implement raster-scanning while reducing occurrence of thermal crosstalk.

In addition, in the present embodiment, the plurality of laser light beams La, Lb, and Lc is outputted to the X scanner section 55 in a state in which the optical axes of the plurality of laser light beams La, Lb, and Lc are shifted from each other. Accordingly, the surface of the recording medium 10 is irradiated with the plurality of laser light beams La, Lb, and Lc at the predetermined intervals $\Delta X1$ and $\Delta X2$, which makes it possible to reduce occurrence of thermal crosstalk between the recording layers 13 and 15 adjacent in the stacking direction and between the recording layer 15 and 17 adjacent in the stacking direction. As a result, it is possible to reduce a possibility that unexpected writing and erasing occur.

In addition, the plurality of laser light beams La, Lb, and Lc is outputted to the X scanner section 55 to cause the optical axes of the plurality of laser light beams La, Lb, and Lc to be parallel to each other at the predetermined intervals $\Delta X1$ and $\Delta X2$. Accordingly, the surface of the recording medium 10 is irradiated with the plurality of laser light beams La, Lb, and Lc at the predetermined intervals $\Delta X1$ and $\Delta X2$, which makes it possible to reduce occurrence of thermal crosstalk between the recording layers 13 and 15 adjacent in the stacking direction and between the recording layer 15 and 17 adjacent in the stacking direction. As a result, it is possible to reduce a possibility that unexpected writing and erasing occur.

In addition, in the present embodiment, the plurality of laser light beams La, Lb, and Lc is outputted to the X scanner section 55 to cause the optical axes of the plurality of laser light beams La, Lb, and Lc to intersect with each other at a predetermined angle. Accordingly, the surface of the recording medium 10 is irradiated with the plurality of laser light beams La, Lb, and Lc at the predetermined intervals ΔX1 and ΔX2, which makes it possible to reduce occurrence of thermal crosstalk between the recording layers 13 and 15 adjacent in the stacking direction and between the recording layer 15 and 17 adjacent in the stacking direction. As a result, it is possible to reduce a possibility that unexpected writing and erasing occur.

2. Modification Examples

In the following, description is given of modification examples of the drawing system 100 according to the embodiment of the present disclosure.

Modification Example A

FIG. 7 illustrates a modification example of a schematic configuration of the drawing system 100 according to the embodiment described above. In the embodiment described above, raster-scanning is implemented by scanning with the laser light beams La, Lb, and Lc in the X-axis direction by the X scanner section 55 and moving the Y stage 57 in the Y-axis direction. However, in the embodiment described above, for example, as illustrated in FIG. 7, raster-scanning may be implemented by using an XY scanner driving circuit 54A, an XY scanner section 55A, and a fixed stage 57A in place of the scanner driving circuit 54, the X scanner section 55, the Y stage driving circuit 56, and the Y stage 57.

The XY scanner driving circuit 54A drives the XY scanner section 55A on the basis of, for example, a control signal inputted from the signal processing circuit 51. In addition, in a case where a signal of an irradiation angle of a two-axis scanner 55c to be described later is inputted from the XY scanner section 55A, the XY scanner driving circuit 54A drives the XY scanner section 55A to cause the irradiation angle to be a desired irradiation angle on the basis of the signal.

For example, the XY scanner section 55A scans the surface of the recording medium 10 in the X-axis direction with the laser light beams La, Lb, and Lc incident form the light source section 53, and moves scan lines of the laser light beams La, Lb, and Lc in the Y-axis direction with a predetermined step width. The XY scanner section 55A includes, for example, the two-axis scanner 55c and the fθ lens 55b. The two-axis scanner 55c is a galvanometer mirror that scans the surface of the recording medium 10 in the X-axis direction with the laser light beams La, Lb, and Lc incident from the light source section 53 on the basis of a drive signal inputted from the XY scanner driving circuit 54A and moves the scan lines of the laser light beams La, Lb, and Lc in the Y-axis direction with the predetermined step width. The fθ lens 55b converts a constant velocity rotation movement by the two-axis scanner 55c into a constant velocity linear movement of a spot moving on a focal plane (the surface of the recording medium 10). The fixed stage 57A is a stage that simply supports the recording medium 10.

In the present modification example, the XY scanner section 55A is provided that performs scanning with the plurality of laser light beams La, Lb, and Lc in the X-axis direction and moving the scan lines of the plurality of laser light beams La, Lb, and Lc in the Y-axis direction with the predetermined step width. This makes it possible to implement raster-scanning while reducing occurrence of thermal crosstalk.

In addition, in the present embodiment, raster-scanning is executed by scanning with plurality of laser light beams La, Lb, and Lc in the X-axis direction and moving the scan lines of the plurality of laser light beams La, Lb, and Lc in the Y-axis direction with the predetermined step width in a state in which the recording medium 10 stands still. This makes it possible to implement raster-scanning while reducing occurrence of thermal crosstalk.

Modification Example B

FIG. 8 illustrates a modification example of a schematic configuration of the drawing system 100 according to the embodiment described above. In the embodiment described above, raster-scanning is implemented by scanning with the laser light beams La, Lb, and Lc in the X-axis direction by the X scanner section 55 and moving the Y stage 57 in the Y-axis direction. However, in the embodiment described above, for example, as illustrated in FIG. 8, raster-scanning may be implemented by using a light source section 53D in place of the light source section 53 and using an XY stage driving circuit 56A and an XY stage 57B in place of the scanner driving circuit 54, the X scanner section 55, the Y stage driving circuit 56, and the Y stage 57.

The light source section 53D corresponds to the light source section 53 further including a condenser lens 53e that condenses the laser light beams La, Lb, and Lc. The XY stage driving circuit 56A drives the XY stage 57B on the basis of, for example, a control signal inputted from the signal processing circuit 51. The XY stage 57B moves the XY stage 57B in the X-axis direction at a predetermined speed and moves the XY stage 57B in the Y-axis direction with a predetermined step width. The surface of the recording medium 10 is raster-scanned with the laser light beams La, Lb, and Lc by the operation of the XY stage 57B.

In the present modification example, the XY stage 57B is provided that performs scanning in the X-axis direction with the plurality of laser light beams La, Lb, and Lc and moving the scan lines of the plurality of laser light beams La, Lb, and Lc in the Y-axis direction with the predetermined step width. This makes it possible to implement raster-scanning while reducing occurrence of thermal crosstalk.

Modification Example C

FIG. 9 illustrates a modification example of a schematic configuration of the drawing system 100 according to the embodiment described above. In the embodiment described above, the optical system including the dichroic mirror 53b and the like is used to arrange the laser light beams La, Lb, and Lc side by side in a predetermined direction at predetermined intervals and output the laser light beams La, Lb, and Lc. However, in the embodiment described above, a light source section 53E may be used in place of the light source section 53 to arrange the laser light beams La, Lb, and Lc side by side in a predetermined direction at predetermined intervals and output the laser light beams La, Lb, and Lc.

As illustrated in FIG. 9, the light source section 53E includes, for example, three light sources 53A, 53B, and 53C, three optical fibers 53f, 53g, and 53h, and a fiber holder 53i, and a condenser lens 53j.

The optical fiber 53f is coupled to the light source 53A, and propagates the laser light beam La emitted from the light source 53A. The optical fiber 53g is coupled to the light source 53B, and propagates the laser light beam Lb emitted from the light source 53B. The optical fiber 53h is coupled to the light source 53C, and propagates the laser light beam Lc emitted from the light source 53C. The fiber holder 53i arranges and holds tip portions of the three optical fibers 53f, 53g, and 53h side by side in a predetermined direction. The condenser lens 53j condenses the laser light beams La, Lb, and Lc emitted from the tip portions of the three optical fibers 53f, 53g, and 53h. The laser light beams La, Lb, and Lc condensed by the condenser lens 53j are outputted to the X scanner section 55.

In the present modification example, the plurality of laser light beams La, Lb, and Lc is outputted to the X scanner section 55 via the optical fibers 53f, 53g, and 53h respectively separately provided for the laser light beams La, Lb, and Lc. This causes the surface of the recording medium 10 to be irradiated with the plurality of laser light beams La, Lb, and Lc at the predetermined intervals ΔX1 and ΔX2, which makes it possible to reduce occurrence of thermal crosstalk between the recording layers 13 and 15 adjacent in the stacking direction and between the recording layer 15 and 17 adjacent in the stacking direction. As a result, it is possible to reduce a possibility that unexpected writing and erasing occur.

Modification Example D

FIG. 10 illustrates a modification example of a schematic configuration of the drawing system 100 according to the modification example A described above. In the modification example A described above, the optical system including the dichroic mirror 53b and the like is used to arrange the laser light beams La, Lb, and Lc side by side in the predetermined direction at predetermined intervals and output the laser light beams La, Lb, and Lc. However, in the modification example A described above, the light source section 53E may be used in place of the light source section 53 to arrange the laser light beams La, Lb, and Lc side by side in a predetermined direction at predetermined intervals and output the laser light beams La, Lb, and Lc. Even in such a case, it is possible to implement raster-scanning while reducing occurrence of thermal crosstalk.

Modification Example E

FIG. 11 illustrates a modification example of a schematic configuration of the drawing system 100 according to the modification example B described above. In the modification example B described above, the optical system including the dichroic mirror 53b and the like is used to arrange the laser light beams La, Lb, and Lc side by side in the predetermined direction at predetermined intervals and output the laser light beams La, Lb, and Lc. However, in the modification example B described above, a light source section 53F may be used in place of the light source section 53 to arrange the laser light beams La, Lb, and Lc side by side in a predetermined direction at predetermined intervals and output the laser light beams La, Lb, and Lc. As illustrated in FIG. 11, the light source section 53F includes, for example, three light sources 53A, 53B, and 53C, three optical fibers 53f, 53g, and 53h, the fiber holder 53i, and a condenser lens 53e. Even in such a case, it is possible to implement raster-scanning while reducing occurrence of thermal crosstalk.

Modification Example F

FIG. 12 illustrates a modification example of a drawing method in the drawing system 100 according to the embodiment described above and the modification examples thereof. In the embodiment described above and the modification examples thereof, scanning is performed with the laser light beams La, Lb, and Lc at the predetermined intervals in a direction parallel to the X-axis direction. However, for example, as illustrated in FIG. 12, scanning may be performed in the X-axis direction with the laser light beams La, Lb, and Lc arranged side by side at predetermined intervals in a direction (Y-axis direction) orthogonal to the X-axis direction. In this case, a mechanism that is able to execute such scanning scans the surface of the recording medium 10 with the plurality of laser light beams La, Lb, and Lc in a state in which the plurality of irradiation spots Pa, Pb, and Pc of the plurality of laser light beams La, Lb, and Lc are arranged side by side at predetermined intervals in a direction (Y-axis direction) orthogonal to the scanning direction (X-axis direction) of the plurality of laser light beams La, Lb, and Lc.

In the present modification example, the light source section 53 includes, for example, an optical system that arranges a plurality of laser light beams (e.g., three laser light beams La, Lb, and Lc) emitted from a plurality of light sources (e.g., the three light sources 53A, 53B, and 53C) side by side in the Y-axis direction at predetermined intervals, and outputs the plurality of laser light beams. For example, this optical system outputs the plurality of laser light beams La, Lb, and Lc to the X scanner section 55 to cause the plurality of irradiation spots Pa, Pb, and Pc to be arranged side by side in the Y-axis direction on the Y stage 57 at predetermined intervals in order of the irradiation spots Pa, Pb, and Pc.

Here, the irradiation spot Pa moves on a line L1 corresponding to a certain pixel row in the recording medium 10. The irradiation spot Pa moves on the line L1 corresponding to the certain pixel row in the recording medium 10. The irradiation spot Pb moves on a line L2 corresponding to a certain pixel row at a location separated by a predetermined distance from the pixel row where the irradiation spot Pa moves in the recording medium 10. The irradiation spot Pc moves on a line L3 corresponding to a certain pixel row at a location separated by a predetermined distance from the pixel row where the irradiation spot Pb moves in the recording medium 10.

FIG. 13, FIG. 14, and FIG. 15 each illustrate an example of a drawing procedure in the drawing system 100 according to the present modification example.

The drawing system 100 first irradiates the recording medium 10 with the laser light beam La to scan the irradiation spot Pa in the X-axis direction. Then, upon completing scanning for one line of the irradiation spot Pa, the drawing system 100 temporarily stops irradiation with the laser light beam La, and moves the Y stage 47 in the Y-axis direction to move the recording medium 10 in the Y-axis direction by a predetermined distance. Next, the drawing system 100 irradiates, with the laser light beam La, a location separated by a predetermined distance from a most recently scanned line to scan the irradiation spot Pa in the X-axis direction. Thus, the drawing system 100 scans the recording medium 10 with the laser light beam La in the X-axis direction a plurality of times (see FIG. 13). In this case, in the recording medium 10, a portion of the recording layer 13 develops a predetermined color (Color A) by irradiation with the laser light beam La.

Next, the drawing system 100 irradiates the recording medium 10 with the laser light beams La and Lb to scan the irradiation spots Pa and Pb in the X-axis direction. In this case, the drawing system 100 irradiates, with the laser light beam Lb, the line scanned with the laser light beam La in the recording medium 10 to scan the irradiation spot Pb in the X-axis direction. Then, upon completing scanning for one line of each of the irradiation spots Pa and Pb, the drawing system 100 temporarily stops irradiation with the laser light beams La and Pb, and moves the Y stage 47 in the Y-axis direction to move the recording medium 10 in the Y-axis direction by a predetermined distance.

Next, the drawing system 100 irradiates locations separated by a predetermined distance from most recently scanned lines with the laser light beams La and Lb to scan the irradiation spots Pa and Pb in the X-axis direction. Even in this case, the drawing system 100 irradiates, with the laser light beam Lb, the line scanned with the laser light beam La in the recording medium 10 to scan the irradiation spot Pb in the X-axis direction. Thus, the drawing system 100 scans the recording medium 10 with the laser light beams La and Lb in the X-axis direction a plurality of times (see FIG. 14).

In this case, in the recording medium 10, a portion of the recording layer 13 develops the predetermined color (Color A) in by irradiation with the laser light beam La, and a portion of the recording layer 15 further develops a predetermined color (Color B) by irradiation with the laser light beam Lb. In the recording medium 10, a combination color of the Color A and the Color B is developed at a location where both the recording layers 13 and 15 develop the colors as viewed from the stacking direction.

Next, the drawing system 100 irradiates the recording medium 10 with the laser light beams La, Lb, and Lc to scan the irradiation spots Pa, Pb, and Pc in the X-axis direction. In this case, the drawing system 100 irradiates, with the laser light beam Lb, the line scanned with the laser light beam La in the recording medium 10 to scan the irradiation spot Pb in the X-axis direction. Furthermore, the drawing system 100 irradiates, with the laser light beam Lc, the line scanned with the laser light beam Lb in the recording medium 10 to scan the irradiation spot Pc in the X-axis direction. Then, upon completing scanning for one line of each of the irradiation spots Pa, Pb, and Pc, the drawing system 100 temporarily stops irradiation with the laser light beams La, Pb, and Lc, and moves the Y stage 47 in the Y-axis direction to move the recording medium 10 in the Y-axis direction by a predetermined distance.

Next, the drawing system 100 irradiates locations separated by a predetermined distance from most recently scanned lines with the laser light beams laser light beams La, Lb, and Lc to scan the irradiation spots Pa, Pb, and Pc in the X-axis direction. Even in this case, the drawing system 100 irradiates, with the laser light beam Lb, the line scanned with the laser light beam La in the recording medium 10 to scan the irradiation spot Pb in the X-axis direction. Furthermore, the drawing system 100 irradiates, with the laser light beam Lc, the line scanned with the laser light beam Lb in the recording medium 10 to scan the irradiation spot Pc in the X-axis direction. Thus, the drawing system 100 scans the recording medium 10 with the laser light beams La, Lb, and Lc in the X-axis direction a plurality of times (see FIG. 15).

In this case, in the recording medium 10, a portion of the recording layer 13 develops the predetermined color (Color A) by irradiation with the laser light beam La, a portion of the recording layer 15 further develops the predetermined color (Color B) by irradiation with the laser light beam Lb, and a portion of the recording layer 17 develops a predetermined color (Color C) by irradiation with the laser light beam Lc. In the recording medium 10, a combination color (e.g., BLACK) of the Color A, the Color B, and the Color C is developed at a location where all the recording layers 13, 15, and 17 develop the colors as viewed from the stacking direction.

Incidentally, a distance $\Delta y1$ between the irradiation spot Pa and the irradiation spot Pb is set to cause, for example, a period (cooling period $\Delta t1$ in a predetermined pixel) from when the predetermined pixel in the recording medium 10 is irradiated with the laser light beam La to when the predetermined pixel is irradiated with the laser light beam Lb to be 0.2 seconds or more. In addition, a distance $\Delta y2$ between the irradiation spot Pb and the irradiation spot Pcb is set to cause, for example, a period (cooling period $\Delta t2$ in the predetermined pixel) from when the predetermined pixel in the recording medium 10 is irradiated with the laser light beam Lb to when the predetermined pixel is irradiated with the laser light beam Lc to be 0.2 seconds or more. The distance $\Delta y1$ and the distance $\Delta y2$ may be equal to or different from each other. The cooling period $\Delta t1$ and the cooling period $\Delta t2$ may be equal to or different from each other.

When focusing on the predetermined pixel in the recording medium 10, a timing at which the pixel is irradiated with the laser light beam La, a timing at which the pixel is irradiated with the laser light beam Lb, and a timing at which the pixel is irradiated with the laser light beam Lc are different from each other. Accordingly, the cooling periods $\Delta t1$ and $\Delta t2$ are provided for each pixel in the recording medium 10. Then, the cooling periods $\Delta t1$ and $\Delta t2$ are 0.2 second or more as described above, which makes it possible to perform next laser irradiation in a state in which each pixel is sufficiently cooled. As a result, it is possible to prevent thermal crosstalk that occurs in the comparative example illustrated in FIG. 5, and it is possible to achieve favorable drawing quality. It is to be noted that the cooling periods $\Delta t1$ and $\Delta t2$ are not necessarily 0.2 second or more, and may be set in accordance with demanded drawing quality.

FIG. 16 illustrates experiment results in a plurality of examples in which various distances $\Delta y1$ and $\Delta y2$ are set in the comparative example illustrated in FIG. 5 and the present modification example. In FIG. 16, $\Delta E\_avg$ represents an average value of a color difference $\Delta E^*$ in each example with respect to the comparative example when a black image is drawn on the recording medium 10. In FIG. 16, determination represents a result of determination whether or not the average value of the color difference $\Delta E^*$ is equal to or less than an upper limit value of class B tolerance of 6.5. In a case where the average value of the color difference $\Delta E^*$ is equal to or less than the upper limit value of class B tolerance of 6.5, the average value of the color difference $\Delta E^*$ is determined as pass represented by a circle symbol. In contrast, in a case where the average value of the color difference $\Delta E^*$ exceeds the upper limit value of class B tolerance of 6.5, the average value of the color difference $\Delta E^*$ is determined as fail represented by a cross symbol. In FIG. 16, takt represents time necessary to draw the black image on the recording medium 10. In FIG. 16, the takt is represented with a value with reference to the takt of the comparative example. As can be seen from FIG. 16, examples 6 to 11 are determined as pass represented by the circle symbol, and in examples 1 to 11, the takt is ⅓ of the takt of the comparative example.

It is to be noted that in the present modification example, the XY scanner driving circuit 54A, the XY scanner section 55A, and the fixed stage 57A may be used in place of the scanner driving circuit 54, the X scanner section 55, the Y stage driving circuit 56, and the Y stage 57 to implement raster-scanning.

Modification Example G

FIG. 17 illustrates a modification example of the drawing method in the drawing system 100 according to the modification example F described above. In the modification example F described above, scanning is performed in the X-axis direction in a state in which the laser light beams La, Lb, and Lc are arranged side by side at predetermined intervals in the direction (Y-axis direction) orthogonal to the X-axis direction. However, for example, as illustrated in FIG. 17, scanning may be performed in the X-axis direction in a state in which the laser light beams La, Lb, and Lc are arranged side by side at predetermined intervals in a direction obliquely intersecting with both the X-axis direction and the Y-axis direction. In other words, the irradiation spots Pa, Pb, and Pc may not be linearly arranged in a direction parallel to a Y axis, and the irradiation spots Pb and Pc may be shifted from the irradiation spot Pa not only in the X-axis direction but also in the Y-axis direction. In this case, a mechanism that is able to execute such scanning scans the surface of the recording medium 10 with the plurality of laser light beams La, Lb, and Lc in a state in which the plurality of irradiation spots Pa, Pb, and Pc of the plurality of laser light beams La, Lb, and Lc are arranged side by side at predetermined intervals in the direction obliquely intersecting with both the X-axis direction and the Y-axis direction.

In the present modification example, the light source section 53 includes, for example, an optical system that arranges a plurality of laser light beams (e.g., three laser light beams La, Lb, and Lc) emitted from a plurality of light sources (e.g., the three light sources 53A, 53B, and 53C) side by side in the direction obliquely intersecting with both the X-axis direction and the Y-axis direction at predetermined intervals, and outputs the plurality of laser light beams. For example, this optical system outputs the plurality of laser light beams La, Lb, and Lc to the X scanner section 55 to cause the plurality of irradiation spots Pa, Pb, and Pc to be arranged side by side in the direction obliquely intersecting with both the X-axis direction and the Y-axis direction on the Y stage 57 at predetermined intervals in order of the irradiation spots Pa, Pb, and Pc. Even in such a case, as with the modification example F described above, it is possible to prevent thermal crosstalk that occurs in the comparative example in FIG. 5, and it is possible to achieve favorable drawing quality.

In the present modification example, the irradiation spots Pa, Pb, and Pc may not be linearly arranged, and shift amounts with respect to a line segment parallel to the Y axis of the irradiation spots Pa, Pb, and Pc may be set at any amount. In this case, a mechanism that is able to execute scanning in the drawing system 100 may scan the surface of the recording medium 10 with the plurality of laser light beams La, Lb, and Lc in a state in which respective lines being scanned with the laser light beams La, Lb, and Lc do not overlap each other (that is, a state in which the same line is not scanned with the plurality of laser light beams La, Lb, and Lc). Even in such a case, as with the modification example F described above, it is possible to prevent thermal crosstalk that occurs in the comparative example illustrated in FIG. 5, and it is possible to achieve favorable drawing quality.

In the present modification example, the XY scanner driving circuit 54A, the XY scanner section 55A, and the fixed stage 57A may be used in place of the scanner driving circuit 54, the X scanner section 55, the Y stage driving circuit 56, and the Y stage 57 to implement raster-scanning.

It is to be noted that in the embodiment described above and the modification examples thereof, for example, the laser driving circuit 52 may pulse-drive the light sources 53A, 53B, and 53C of the light source section 53, or may continuously drive the light sources 53A, 53B, and 53C of the light source section 53 while one line is scanned. In continuous driving the lightsources 53A, 53B, and 53C, the laser driving circuit 52 may set power of at least one light source of the light source 53A, 53B, or 53C to zero depending on a color to be represented.

It is to be noted that the effects described herein are mere examples. Effects of the present disclosure are not limited to those described herein. The present disclosure may further include any effects other than those described herein.

In addition, the present disclosure may have the following configurations, for example.

(1)

A drawing system that performs drawing on a recording medium, the recording medium including a plurality of recording layers stacked with a heat-insulating layer interposed therebetween, the plurality of recording layers including coloring compounds different from each other and photothermal conversion agents different from each other, the drawing system including:

a light source section that generates a plurality of laser light beams having wavelengths that are different from each other and correspond to absorption wavelengths of the photothermal conversion agents; and a scanning section that irradiates a surface of the recording medium with the plurality of laser light beams generated by the light source section at predetermined intervals, and scans the surface of the recording medium with the plurality of laser light beams in synchronization in a same direction, in which the scanning section scans the surface of the recording medium with the plurality of laser light beams in a state in which irradiation spots of the plurality of laser light beams are arranged side by side at predetermined intervals in a direction orthogonal to or obliquely intersecting with a scanning direction of the plurality of laser light beams.

(2)

The drawing system according to (1), in which the scanning section scans, with a second laser light beam of the plurality of laser light beams, a line scanned with a first laser light beam of the plurality of laser light beams in the recording medium, the second laser light beam being different from the first laser light beam.

(3)

The drawing system according to (1) or (2), in which the scanning section includes an optical system and a stage, the optical system that performs scanning with the plurality of laser light beams in a first direction, and the stage that moves the recording medium in a second direction orthogonal to the first direction.

(4)

The drawing system according to (1) or (2), in which the scanning section includes an optical system that performs scanning with the plurality of laser light beams in a first direction and moves scan lines of the plurality of laser light beams in a second direction orthogonal to the first direction with a predetermined step width.

(5)

The drawing system according to any one of (1) to (4), in which the light source section outputs the plurality of laser light beams to the scanning section in a state in which optical axes of the plurality of laser light beams are shifted from each other.

(6)

The drawing system according to (5), in which the light source section outputs the plurality of laser light beams to the scanning section to cause optical axes of the plurality of laser light beams to be parallel to each other at predetermined intervals.

(7)

The drawing system according to (5), in which the light source section outputs the plurality of laser light beams to the scanning section to cause optical axes of the plurality of laser light beams to intersect with each other at a predetermined angle.

(8)

The drawing system according to (5), in which the light source section outputs the plurality of laser light beams to the scanning section via optical fibers provided separately for each of the laser light beams.

(9)

A drawing method being a method of performing drawing on a recording medium, the recording medium including a plurality of recording layers stacked with a heat-insulating layer interposed therebetween, the plurality of recording layers including coloring compounds different from each other and photothermal conversion agents different from each other, the drawing method including:
  generating a plurality of laser light beams having wavelengths that are different from each other and correspond to absorption wavelengths of the photothermal conversion agents;
  irradiating a surface of the recording medium with the plurality of laser light beams generated at predetermined intervals, and scanning the surface of the recording medium with the plurality of laser light beams in synchronization in a same direction; and
  scanning the surface of the recording medium with the plurality of laser light beams in a state in which irradiation spots of the plurality of laser light beams are arranged side by side at predetermined intervals in a direction orthogonal to or obliquely intersecting with a scanning direction of the plurality of laser light beams.

(10)

The drawing method according to (9), including scanning, with a second laser light beam of the plurality of laser light beams, a line scanned with a first laser light beam of the plurality of laser light beams in the recording medium, the second laser light beam being different from the first laser light beam.

(11)

The drawing method according to (9), including executing raster-scanning by scanning with the plurality of laser light beams in a first direction and moving the recording medium in a second direction orthogonal to the first direction.

(12)

The drawing method according to (9), including executing raster-scanning by scanning with the plurality of laser light beams in a first direction and moving scan lines of the plurality of laser light beams in a second direction orthogonal to the first direction with a predetermined step width in a state in which the recording medium stands still.

This application claims the priority on the basis of Japanese Patent Application No. 2021-061778 filed on Mar. 31, 2021 with Japan Patent Office, the entire contents of which are incorporated in this application by reference.

It should be understood by those skilled in the art that various modifications, combinations, sub-combinations, and alterations may occur depending on design requirements and other factors insofar as they are within the scope of the appended claims or the equivalents thereof.

The invention claimed is:

1. A drawing system configured to perform drawing on a heat-sensitive recording medium, the drawing system comprising:
  a light source section configured to generate a plurality of laser light beams having wavelengths that are different from each other and correspond to absorption wavelengths of photothermal conversion agents; and
  a scanning section configured to irradiate a surface of the recording medium with the plurality of laser light beams generated by the light source section at predetermined intervals, and configured to scan the surface of the recording medium with the plurality of laser light beams in synchronization in a same direction, wherein
  the scanning section is configured to scan the surface of the recording medium with the plurality of laser light beams in a state in which irradiation spots of the plurality of laser light beams are arranged side by side at the predetermined intervals in a linear direction orthogonal to or obliquely intersecting with a scanning direction of the plurality of laser light beams.

2. The drawing system according to claim 1, wherein the scanning section is configured to scan, with a second laser light beam of the plurality of laser light beams, a line scanned with a first laser light beam of the plurality of laser light beams in the recording medium, the second laser light beam being different from the first laser light beam.

3. The drawing system according to claim 1, wherein the scanning section includes an optical system and a stage, the optical system is configured to perform scanning with the plurality of laser light beams in a first direction, and the stage is configured to move the recording medium in a second direction orthogonal to the first direction.

4. The drawing system according to claim 1, wherein the scanning section includes an optical system is configured to perform scanning with the plurality of laser light beams in a first direction and configured to move scan lines of the plurality of laser light beams in a second direction orthogonal to the first direction with a predetermined step width.

5. The drawing system according to claim 1, wherein the light source section is configured to output the plurality of laser light beams to the scanning section in a state in which optical axes of the plurality of laser light beams are shifted from each other.

6. The drawing system according to claim 5, wherein the light source section is configured to output the plurality of laser light beams to the scanning section to cause the optical axes of the plurality of laser light beams to be parallel to each other at predetermined intervals.

7. The drawing system according to claim 5, wherein the light source section is configured to output the plurality of laser light beams to the scanning section to cause the optical axes of the plurality of laser light beams to intersect with each other at a predetermined angle.

8. The drawing system according to claim 5, wherein the light source section is configured to output the plurality of laser light beams to the scanning section via optical fibers provided separately for each of the laser light beams.

9. A drawing method being a method of performing drawing on a heat-sensitive recording medium, the drawing method comprising:
  generating a plurality of laser light beams having wavelengths that are different from each other and correspond to absorption wavelengths of photothermal conversion agents;
  irradiating a surface of the recording medium with the plurality of laser light beams generated at predetermined intervals, and scanning the surface of the recording medium with the plurality of laser light beams in synchronization in a same direction; and
  scanning the surface of the recording medium with the plurality of laser light beams in a state in which irradiation spots of the plurality of laser light beams are arranged side by side at the predetermined intervals in a linear direction orthogonal to or obliquely intersecting with a scanning direction of the plurality of laser light beams.

10. The drawing method according to claim 9, comprising scanning, with a second laser light beam of the plurality of laser light beams, a line scanned with a first laser light beam of the plurality of laser light beams in the recording medium, the second laser light beam being different from the first laser light beam.

11. The drawing method according to claim 9, comprising executing raster-scanning by scanning with the plurality of laser light beams in a first direction and moving the recording medium in a second direction orthogonal to the first direction.

12. The drawing method according to claim 9, comprising executing raster-scanning by scanning with the plurality of laser light beams in a first direction and moving scan lines of the plurality of laser light beams in a second direction orthogonal to the first direction with a predetermined step width in a state in which the recording medium stands still.

* * * * *